US008442706B2

(12) United States Patent
Doeppner et al.

(10) Patent No.: US 8,442,706 B2
(45) Date of Patent: May 14, 2013

(54) MODULE FOR INTEGRATED APPROACH TO AN OFFSHORE FACILITY

(75) Inventors: Ronald S. Doeppner, Palm City, FL (US); Donald W. Fowler, Oxford, CT (US); Stephen P. Lee, Hamden, CT (US); Lan Hoang, Cheshire, CT (US); Anil Mehra, Fairfield, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 509 days.

(21) Appl. No.: 12/345,849

(22) Filed: Dec. 30, 2008

(65) Prior Publication Data

US 2010/0168939 A1 Jul. 1, 2010

(51) Int. Cl.
*G06F 19/00* (2006.01)
*G08B 21/00* (2006.01)
*G08G 5/00* (2006.01)
*B64F 1/20* (2006.01)

(52) U.S. Cl.
USPC .............. 701/16; 340/945; 340/948; 340/951

(58) Field of Classification Search .................. 701/3–5, 701/9, 14, 16, 17, 18, 301, 302; 345/7, 8, 345/158, 419; 340/945–951, 963, 970–974
See application file for complete search history.

(56) References Cited

U.S. PATENT DOCUMENTS

| | | | |
|---|---|---|---|
| 3,892,373 A | 7/1975 | Doniger | |
| 4,109,885 A * | 8/1978 | Pender | 244/7 R |
| 4,249,158 A * | 2/1981 | Basov et al. | 340/953 |
| 4,536,024 A | 8/1985 | Gabriel | |
| 4,633,404 A * | 12/1986 | Greeson et al. | 701/3 |
| 4,695,013 A * | 9/1987 | Trampnau | 244/17.13 |
| 4,748,569 A | 5/1988 | Gordon | |
| 4,825,374 A * | 4/1989 | King et al. | 701/5 |
| 5,015,187 A | 5/1991 | Lord | |
| 5,195,039 A | 3/1993 | Gold et al. | |
| 5,216,611 A * | 6/1993 | McElreath | 701/472 |
| 5,465,142 A | 11/1995 | Krumes et al. | |
| 6,059,226 A | 5/2000 | Cotton et al. | |
| 6,076,024 A | 6/2000 | Thornberg et al. | |
| 6,629,023 B1 * | 9/2003 | Silder et al. | 701/16 |
| 6,720,891 B2 * | 4/2004 | Chen et al. | 340/969 |
| 6,789,768 B1 | 9/2004 | Kalisch | |
| 6,808,140 B2 * | 10/2004 | Moller | 244/12.5 |
| 6,819,266 B2 * | 11/2004 | Greene | 340/969 |
| 7,091,881 B2 | 8/2006 | Judge et al. | |
| 7,106,217 B2 | 9/2006 | Judge et al. | |
| 7,440,826 B2 | 10/2008 | Franceschini et al. | |

(Continued)

OTHER PUBLICATIONS

International preliminary report on patentability, dated Jul. 14, 2011, PCT/US2009/066326.

(Continued)

*Primary Examiner* — James Trammell
*Assistant Examiner* — Majdi Alsomiri
(74) *Attorney, Agent, or Firm* — Carlson, Gaskey & Olds PC

(57) ABSTRACT

A system and method to facilitate approach of a VTOL aircraft to an offshore facility includes inputting a waypoint for a landing platform of an offshore facility into an aircraft module, inputting an offset distance from the landing platform into the aircraft module, inputting a minimum descent height into an aircraft module, and inputting a final approach inbound course toward the landing platform into the aircraft module.

44 Claims, 21 Drawing Sheets

U.S. PATENT DOCUMENTS

2005/0237226 A1* 10/2005 Judge et al. .................. 340/946
2007/0181750 A1* 8/2007 Astruc .......................... 244/220
2008/0119970 A1* 5/2008 Campbell et al. ................. 701/8

OTHER PUBLICATIONS

International Search Report dated Jul. 16, 2010.
GIANT: GNSS Introduction in the Aviation Sector, EGNOS Offshore Helicopter Approach Procedure, pp. 1-8, Jan. 24, 2008.
Federal Aviation Administration Advisory Circular 90-80B, Approval of Offshore Standard Approach Procedures, Airborne Radar Approaches, and Helicopter En Route Descent Areas, Apr. 12, 1999.
Esterline CMC Electronics, CMA-9000 Flight Management System Operator's Manual, Operational Program S/W 169-614876-022, Publication No. 9000-GEN-0105, Item No. 930-6000088-000, Aug. 21, 2008.
N. McFarlane, A New Procedure for North Sea Helicopter Operations, Second GIANT User Forum, Brussels, Belgium, Oct. 9, 2008.
K.M. Dodson and J.R.A. Stevens, A North Sea Trial to Investigate the use of Differential GPS for Instrument Approaches to Offshore Platforms, paper presented at the 23rd European Rotorcraft Forum, Dresden, Germany, Sep. 1997.

* cited by examiner

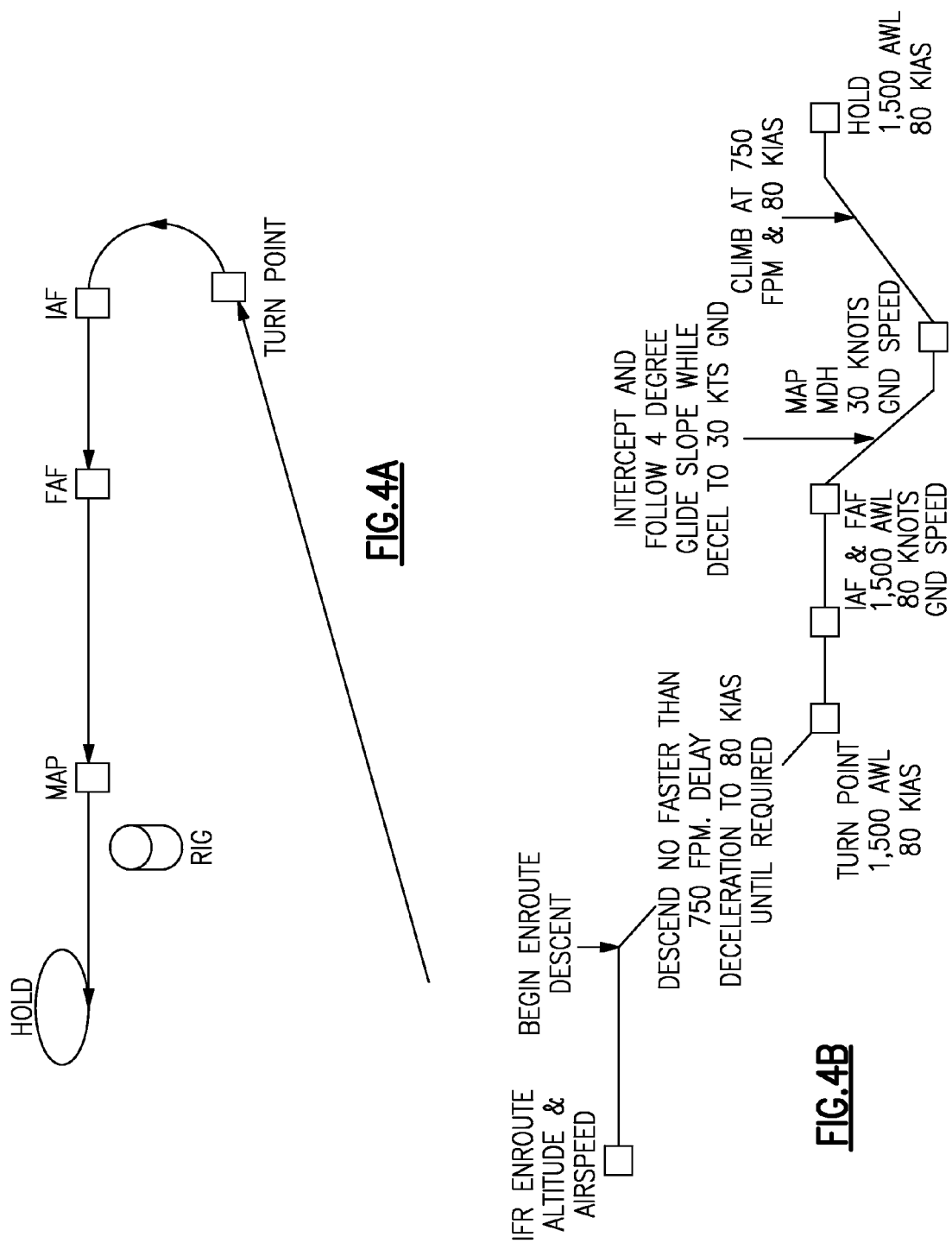

| CONTROL PHASE OF FLIGHT | CYCLIC | | | TRIM BUTTON PUSH & RELEASE | COLLECTIVE | YAW BEEP |
|---|---|---|---|---|---|---|
| | TRIM BUTTON PUSH & RELEASE | LONGITUDINAL BEEP | LATERAL BEEP | | UP/DOWN BEEP | |
| ENROUTE CRUISE. RIG ARMED PRIOR TO INITIAL DESCENT AND DECEL ON THE WAY TO THE TP. ASSUME IAS, APP AND ALT/RALT ACTIVE. | LONGITUDINALLY CAPTURES NEW IAS. LATERALLY ATTEMPT TO REJOIN COURSE TO TP. | INCREASES OR DECREASES DESIRED IAS. | NO AFFECT | CAPTURES NEW BAROMETRIC OR RADAR ALTITUDE | INCREASES OR DECREASES DESIRED RADAR OF BAROMETRIC ALTITUDE | NO AFFECT |
| DURING DESCENT AND/OR DECEL PRIOR TO TP | ATTEMPT TO REJOIN DECEL SCHEDULE AND COURSE TO TP. | NO AFFECT | NO AFFECT | CAPTURES NEW BAROMETRIC OR RADAR ALTITUDE. WILL CONTINUE DESCENT TO 1,000 FEET ONCE THE AIRCRAFT REACHES THE TP. | NO AFFECT | NO AFFECT |
| BETWEEN TP AND IAF | ATTEMPT TO REJOIN IAS SCHEDULE AND COURSE TO IAF. | NO AFFECT | NO AFFECT | CAPTURES NEW BAROMETRIC OR RADAR ALTITUDE. WILL CONTINUE DESCENT TO 1,000 FEET ONCE THE AIRCRAFT REACHES THE IAF. | INCREASES OR DECREASES DESIRED RADAR ALTITUDE IF ALREADY IN AN ALTITUDE HOLD MODE | NO AFFECT |
| BETWEEN TP AND IAF | ATTEMPT TO REJOIN IAS SCHEDULE AND LOC WHEN RELEASED | NO AFFECT | NO AFFECT | CAPTURES AND MAINTAINS CURRENT RADAR ALTITUDE. WILL | INCREASES OR DECREASES DESIRED RADAR ALTITUDE IF | NO AFFECT |

FIG.16A

| | | | | |
|---|---|---|---|---|
| AFTER FAF BUT PRIOR TO CAPTURING VHLD | STOPS DECEL AND CAPTURES CURRENT IAS. ATTEMPTS TO RECAPTURE LOC. | NO AFFECT IF ON DECEL SCHEDULE. INCREASE/ DECREASE IAS WHEN CAPTURED. | NO AFFECT | CONTINUE DESCENT ONCE PAST FAF. | ALREADY IN AN ALTITUDE HOLD MODE |
| ON LOC AND VHLD ENGAGED | DECOUPLES LOC AND CAPTURES CURRENT LAT AND LONG VELOCITIES. | INCREASES OR DECREASES SELECTED GROUND SPEED. | DECOUPLES LOC AND PERMITS LATERAL VELOCITIES IN ROLL VHLD. | CAPTURES AND MAINTAINS CURRENT RALT | NO AFFECT IF ON G/S. INCREASES OR DECREASES DESIRED ALTITUDE IF RALT CAPTURED. | NO AFFECT |
| | DISENGAGE GA. CAPTURE CURRENT GROUND SPEED, RADAR ALTITUDE AND HEADING. | INCREASES OR DECREASES RATE OF ACCELERATION. | DECOUPLES LOC AND PERMITS LATERAL VELOCITIES IN ROLL VHLD | CAPTURES AND MAINTAINS CURRENT RALT | NO AFFECT IF ON G/S. INCREASES OR DECREASES DESIRED ALTITUDE IF RALT CAPTURED. | NO AFFECT IF LOC CAPTURED. CHANGES HEADING IF ROLL MODE IS VHLD. |
| GO AROUND BELOW 50 KIAS | DISENGAGE GA. CAPTURE CURRENT GROUND SPEED, RADAR ALTITUDE AND HEADING. | INCREASES OR DECREASES RATE OF ACCELERATION. | | ATTEMPTS TO REJOIN CLIMB SCHEDULE OR CAPTURES CURRENT RADAR ALTITUDE | INCREASES OR DECREASES RATE OF CLIMB (NO LOWER THAN 200 FPM) | NO AFFECT |
| GO AROUND BELOW 50 KIAS | DISENGAGE GA. CAPTURE CURRENT AIRSPEED, BAROMETRIC ALTITUDE AND HEADING. | INCREASES OR DECREASES COMMANDED ACCELERATION. | NO AFFECT | ATTEMPTS TO REJOIN CLIMB SCHEDULE OR CAPTURES CURRENT BAROMETRIC ALTITUDE | INCREASES OR DECREASES RATE OF CLIMB | NO AFFECT |

MODULE FOR INTEGRATED APPROACH TO AN OFFSHORE FACILITY

BACKGROUND

The present application relates to instrumentation for a rotary wing aircraft and more particularly to an integrated approach display and coupled control system to an offshore facility.

Rotary wing aircraft are routinely required to approach and land at remote offshore sites such as oil rigs. Often obstacles such as ships and weather in the area are unknown or change in route such that current instrument approaches to offshore oil rigs are limited to approximately one-half nautical mile visibility or greater.

Compared to standard instrument approaches to an airfield, offshore approaches require considerable aircrew workload to plan and fly. Currently available cockpit displays provide minimal information on offshore approaches, especially when compared to the situational awareness available for onshore approaches. The FAA desired "stabilized approach" concept is currently not available for an offshore approach.

Although rotary wing aircraft are effectively operated to offshore sites, current approaches require preloaded instrument procedures with a significant number of aircrew actions, many of which must be completed in the critical low level portion of the approach.

SUMMARY

A method to facilitate approach of a VTOL aircraft to an offshore facility according to an exemplary aspect of the present disclosure includes inputting a waypoint for a landing platform of an offshore facility into an aircraft module, inputting an offset distance from the landing platform into the aircraft module and inputting a final approach inbound course toward the landing platform into the aircraft module and inputting the approach descent height for the final descent toward the landing platform into the aircraft module. The method includes determining an Initial Approach Fix (IAF) and a Final Approach Fix (FAF) in response to the waypoint, the offset distance and the final approach inbound course and the approach descent height with the aircraft module and directing the aircraft to the Initial Approach Fix (IAF) in response to the aircraft module.

An aircraft system according to an exemplary aspect of the present disclosure includes a rig approach module which directs an aircraft to an Initial Approach Fix (IAF) downwind of a Final Approach Fix (FAF), the Initial Approach Fix (IAF) and the Final Approach Fix (FAF) determined in response to a waypoint for a landing platform of an offshore facility, an offset distance from the landing platform input, a final approach inbound course toward the landing platform input and an approach descent height input.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4A is a schematic horizontal view of the flight plan provided by the offshore approach mode;

FIG. 4B is a schematic vertical view of the flight plan provided by the offshore approach mode;

FIG. 16 is a chart which describes modifications to the offshore approach mode which may be made by the aircrew via the cyclic and collective trim controls.

DETAILED DESCRIPTION

Figure 1:
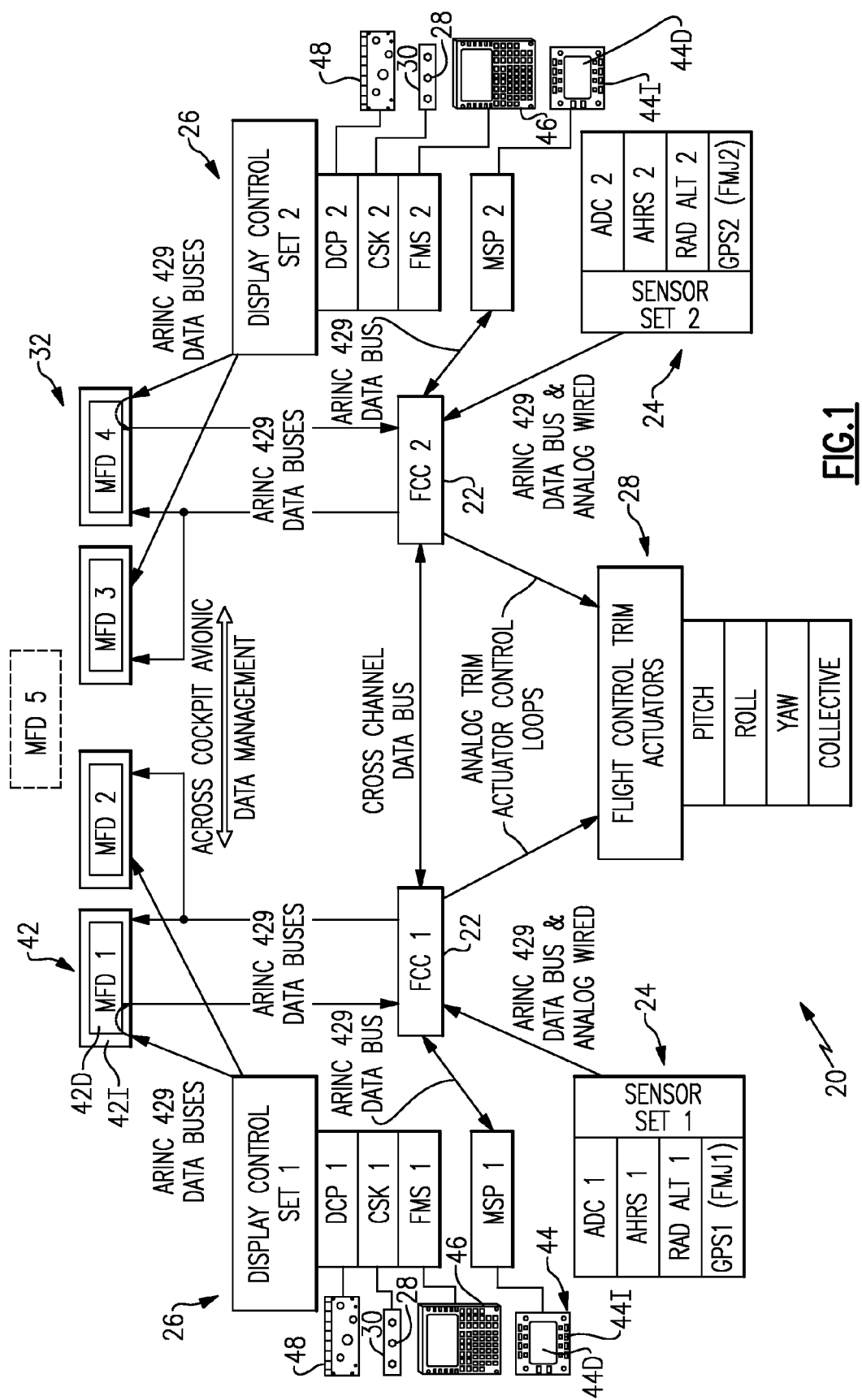
FIG. 1 is a system architecture block diagram view of an aircraft flight control system for use with an embodiment of the invention.

FIG. 1 illustrates a general system architecture block diagram view of an aircraft flight control system 20. The aircraft flight control system 20 includes a plurality of interconnected systems to assist an aircrew with flight operations of a vertical take off and landing (VTOL) aircraft such as a rotary wing aircraft.

The aircraft flight control system 20 generally includes dual redundant Flight Control Computers (FCC1, FCC2) 22. FCC1 and FCC2 may be interconnected for failsafe operations. Although each FCC 22 is schematically illustrated as a single block, each FCC 22 may include multiple computers having multiple channels and multiple redundant subsystems. Each FCC 22 receives input data from a respective sensor set 24 and a respective Mode Select Panel (MSP) 44. Each FCC 22 outputs control commands to a flight control trim actuator system 28 to command the corresponding maneuvers to execute an aircraft autopilot flight plan. The flight control trim actuator system 28 may include, for example, trim actuators, a combination of series actuators and trim actuators, or Fly-By-Wire full authority actuators in a FBW architecture.

The FCC 22 stores programmed flight plans which the aircrew may modify as required in flight. The FCC 22 provides a multiple of autopilot flight modes which include, but are not limited to, stabilized flight path, stabilized approach, hold hover altitude hold, airspeed hold, groundspeed hold, landing operations in zero or near zero visibility, and other autopilot modes such as a RIG approach mode discussed herein as an offshore approach mode. Given the aircraft position and the selected flight plan, the FCC 22 guides the aircraft along the flight plan with the flight control trim actuator system 28.

The RIG approach mode is typically implemented within the architecture of the flight control functionality known as a Coupled Flight Director (CFD). These CFD functions are implemented in a single FCC and outputs are then supplied to the basic flight control functions that control the attitude and heading of the aircraft using both FCC's. In this architecture, the RIG approach mode can be selected to be active in either FCC, but only one side at a time is in control. So, for example, if the CFD is selected active on FCC 2, then the outputs of FCC2 control the local FCC attitude, heading and vertical functions such that these outputs are also supplied via a Cross Channel Data Link (CCDL) to FCC 1 to control attitude and heading and vertical functions in harmony with FCC2. In this type architecture, limits are applied to the single CFD commands so as to avoid excessive response in event of erroneous commands or faults.

Each sensor set 24 provides the FCC 22 with the necessary external information required to build and fly the autopilot flight modes. The sensor set 24 in the disclosed non-limiting embodiment includes, but is not limited to an Air Data Computer (ADC), an Attitude Heading Reference System (AHRS), a Radar Altimeter (Rad Alt), and a Global Positioning System (GPS). The Global Positioning System (GPS) is typically a subsystem of the FMS 22. The sensor set 24 may alternatively or additionally include a variety of other systems.

The Air Data Computer (ADC) provides the system 20 in the disclosed non-limiting embodiment with, but is not limited to, barometric altitude, indicated airspeed, and raw vertical velocity. Each aircraft is typically equipped with two ADCs.

The Attitude Heading Reference System (AHRS) provides the system 20 in the disclosed non-limiting embodiment with, but is not limited to, aircraft attitude and heading, acceleration, and rate information. With input from the ADC, the AHRS provides instantaneous vertical velocity. With input from the FMS's GPS, the AHRS provides a blended navigation position and groundspeed in each direction. Each aircraft is typically equipped with two AHRS.

The Radar Altimeter (Rad Alt) provides aircraft height above the ground and water. An aircraft is typically equipped with one or two Radar Altimeters. When only one Radar Altimeter is installed, the data is shared by both FCCs.

The Mode Select Panel (MSP) 44 is operable to activate the disclosed RIG approach mode and alter the RIG approach mode after selection such as through selection of, for example, an offset distance and offset direction (FIGS. 5A, 6A, 12A, 15A). The MSP 44 generally includes a display 44D and an interface device 44I such as a multiple of soft keys which operate to select particular programmed flight plans such as an approach to an offshore site referred to herein as the RIG approach mode that is accessible when a particular navigation mode such as Long-range Navigation (LNAV) is the selected navigation mode. LNAV is a function of the FMS which provides commands to the FCC 22 which directs lateral movement of the aircraft in accords with the programmed flight plan for normal Navigation mode of the CFD. However, for the RIG approach mode, the LNAV selection enables the FMS to provide the target RIG coordinate position to the FCC via the MFD 42 and to enable the MFD 42 to be set into the RIG PREV state as an entry condition for the RIG Approach mode. Thus, for the described embodiment of RIG Approach mode, the only function of the FMS is to provide the target RIG coordinate position to the FCC 22 and MFD 42. The FCC 22 then determines the appropriate flight plan for RIG Approach and commands the corresponding maneuvers to execute the flight plan. However, this function may alternatively be located within the FMS or MFD which processor. The MFD 42 also use the target RIG coordinate position so as to display the flight plan path on the NAV page of the MFD.

A display control set 26 facilitates aircrew interaction with the system 20 through a cockpit display system 32. The display control set 26 in the disclosed non-limiting embodiment includes, but is not limited to a Course Select Knob (CSK1, CSK2) 28 located on a Remote Instrument Controller (RIC) 30, a Flight Management System 46 and a Display Control Panel (DCP) 48 which may include a knob to set the descent height for the RIG Approach mode. The display control set 26 may alternatively or additionally include a variety of other systems.

The Course Select Knobs (CSK1, CSK2) 28 are located on the Remote Instrument Controller (RIC) 30. The CSK 28 is operable to set a desired course. Each aircraft is typically equipped with one RIC 30.

The Flight Management System (FMS) 46 generally includes a display 46D and an interface device 46I such as a control panel. The FMS 46 operates to program waypoints and the coordinate flight plans of the aircraft. The Global Positioning System (GPS) is typically a subsystem of the FMS 22. Each FMS 46 is included in the respective display control set 26. Each FMS 46 includes a GPS receiver which is schematically illustrated in the sensor set 24 and the interface device 461 operable by the aircrew to designate the desired waypoint such that the FMS 46 is schematically illustrated in the display control set 26.

The FCCs receive information from the FMS 46 through communication of data from the MFD 42 to the on-side FCC. The FCC may use the outboard MFD data input normally but may provide an alternate path from the inboard MFD in event of a fault. The MFDs receive information from the on-side FCC. The MFDs provide across-cockpit management of the RIG approach mode and annunciation states, as well as for other functions, since the RIG approach mode is typically active in only a single FCC 22 at a time.

The Display Control Panel (DCP) 48 is operable to select the FMS as the primary navigation source, preview the particular autopilot approaches such as the disclosed RIG approach and set limits on the particular approaches such as a minimum decision height. Each aircraft is typically equipped with two DCPs.

The cockpit display system 32 in the disclosed non-limiting embodiment includes, but is not limited to, a multiple of multifunction displays (MFDs) 42. Each MFD 42 generally includes a display 42D and an interface device 421 to control avionics and display various flight symbology pages to the aircrew. Each MFD 42 displays a choice of pages 42P to the aircrew such as, for example, a navigation (NAV) page 42P#1, a primary flight display (PFD) page 42P#2, a hover (HOVER) page 42P#3, and others which may be selected on the MFD 42 to facilitate flight operations, provide the aircrew with a depiction of aircraft position in relation to the approach course, the designated waypoints, and any potentials obstacles. Each FCC 22 may also communicate with various avionics systems through MFD 42 data which is, in turn, received from the sensor set 24 as well as data processed within the MFD 42.

Figure 2:
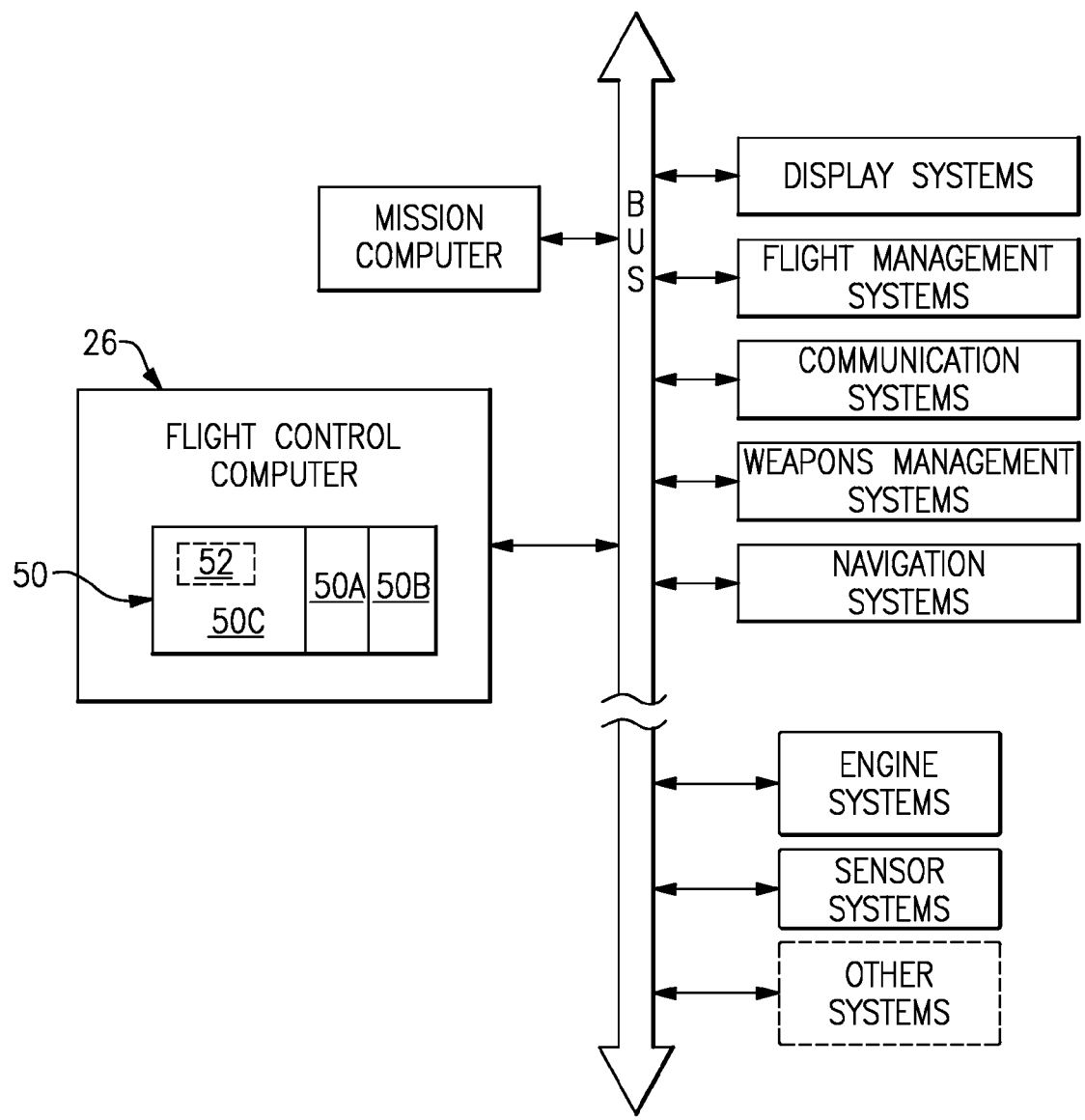
FIG. 2 is a schematic block diagram view of a Flight Control Computer with a Rig Approach module that provides one or more modes such as an offshore approach mode.

Referring to FIG. 2, the FCC 22 may include a multiple of modules such as a Rig Approach module 50 which provides a multiple of modes such as an offshore approach mode 52 illustrated in the disclosed non-limiting embodiment as a RIG approach. It should be understood that the term "module" as utilized herein may be dedicated or multi-functional hardware circuitry or programmed software routines for operation of various systems and subsystems. The various systems and subsystems may include, but is not limited to, display systems, flight management systems, communication systems, weapon management systems, navigation systems, air data computers, engine systems, sensor systems, collision and avoidance systems, as well as other types of systems. The data from the various aircraft systems may be placed on several data busses so as to be shared throughout the system 20. Particular flight data may alternatively or additionally be communicated directly from the sensor set 24 to the cockpit display system 32.

The module 50 may include a processor 50A, a memory 50B, and an interface 50C. The processor 50A may be a custom made or commercially available power PC type processor, a central processing unit, a processor among several processors associated with the FCC 22, a semiconductor based microprocessor in the form of a microchip or chip set or generally any device operable to execute software instructions such as modes stored in memory 50B to provide the desired operations. The memory 50B can include any one or combination of volatile memory elements, nonvolatile memory elements of a distributed architecture, where various components are situated remotely from one another, but are accessed by the processor 50A. The memory 50B may additionally incorporate removable types of storage media. The interface 50C communicates with the data bus 22 to control aircraft systems and display information received from other avionics systems.

The module 50 may obtain aircraft dynamic state, ambient conditions as well as other data from the data bus 22. The module 50 stores data and control algorithms such as the offshore approach mode 52. The stored data and modes are the scheme by which decisions are made to perform the operations disclosed herein. When in operation, the processor 50A may be configured to execute the offshore approach mode 52 stored within the memory 50B and to generally control operations pursuant therewith.

Figure 3A:
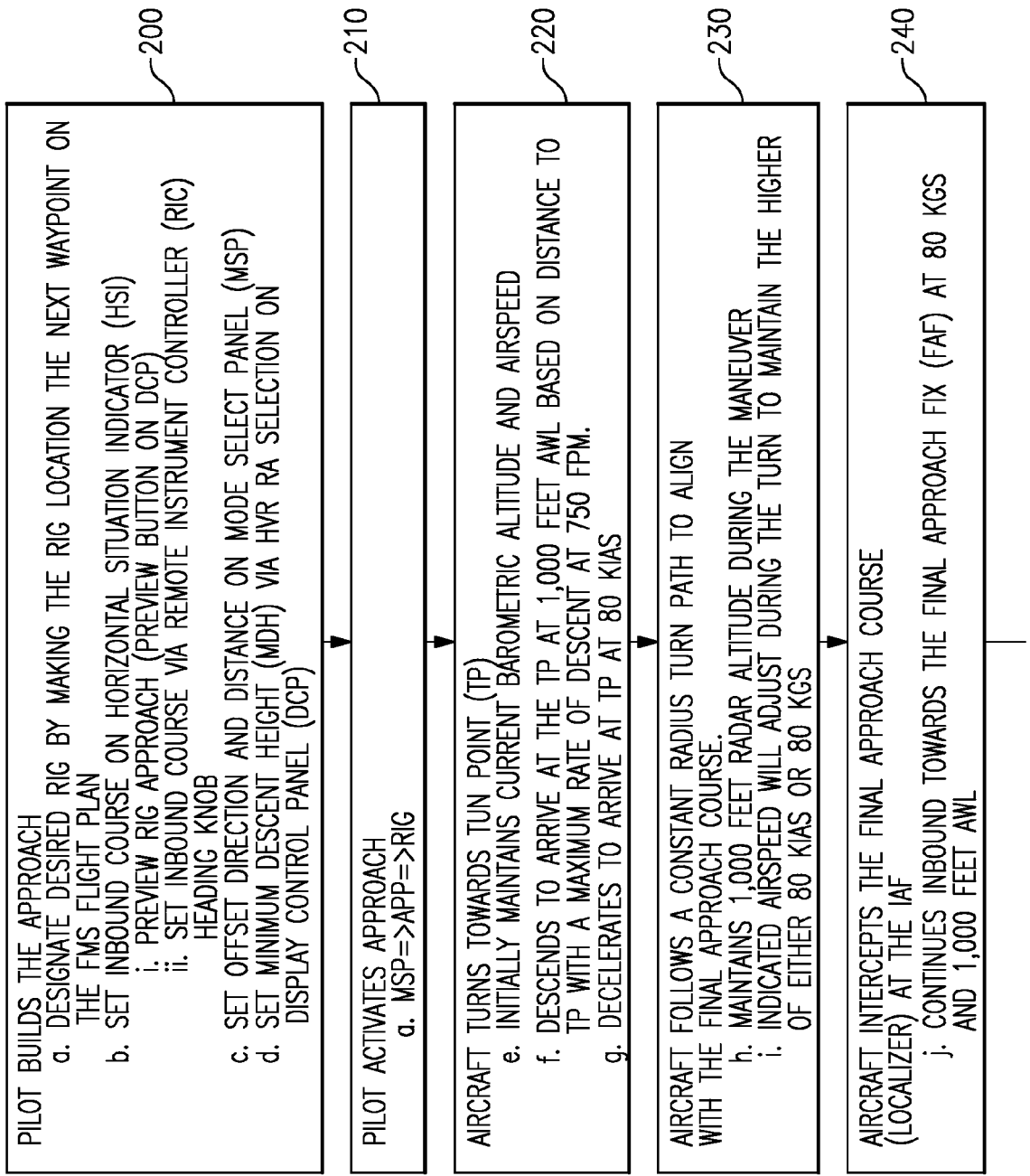
FIG. 3 is a flowchart which illustrates functions of the offshore approach mode in a functional block diagram format.
Figure 3B:
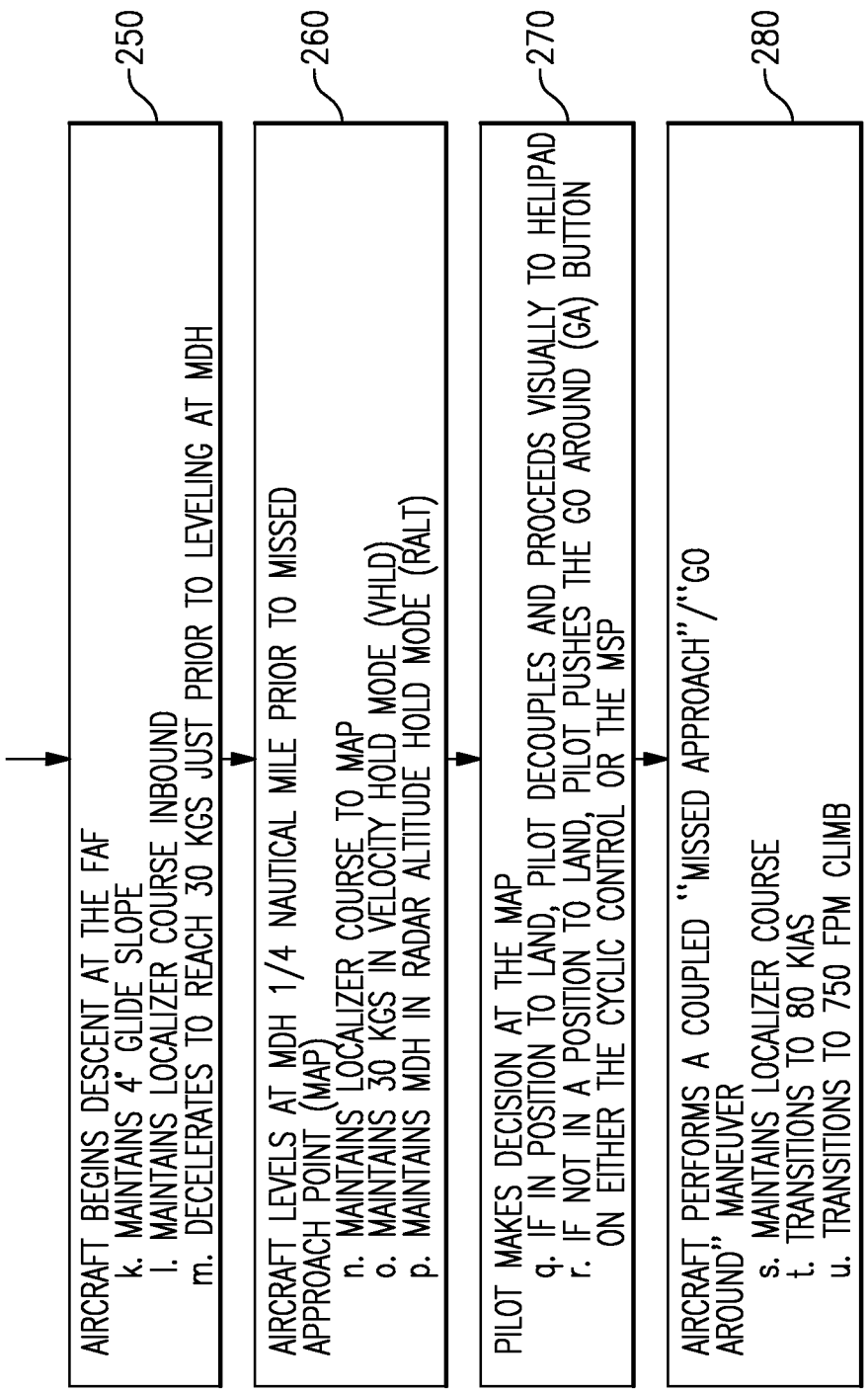
Figure 5A:
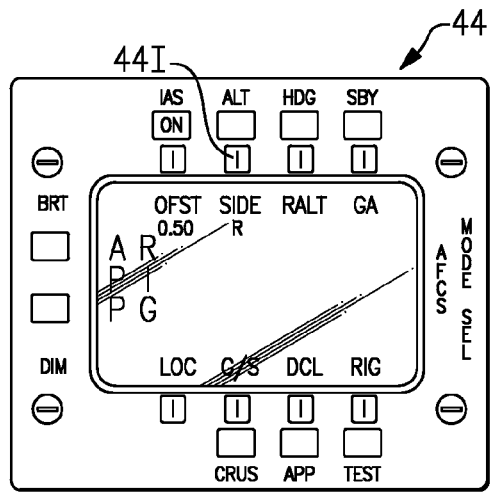
FIG. 5A is a schematic view of a Mode Select Panel MSP displayed as would be viewed prior to initiation of the offshore approach mode.

Referring to FIG. 3, the functions of the offshore approach mode 52 are schematically disclosed in a functional block diagram format. The offshore approach mode 52 facilitates fully coupled, GPS based approaches to offshore facilities such as oil rigs in Instrument Meteorological Conditions. The module 50 provides for lower weather minimum operations in the offshore environment, for example, from 0.5 mile visibility minimums to 0.12 mile minimums with an increase in flight safety due to reduced aircrew workload, enhanced display symbology and a stabilized approach procedure. The proposed system reduces aircrew actions, all of which need only be accomplished in the relatively low stress, cruise phase of the approach.

The offshore approach mode 52 positions the aircraft, in the herein described non-limiting embodiment, on a specified course, at 30 knots ground speed, in a position which is offset to a specified side and 50 feet above the height of the landing platform of the oil rig. The offset position permits a straight ahead missed approach, maximum one engine inoperable performance and increased visual identification of the landing platform.

The offshore approach mode 52 requires only that the aircrew input the location of the oil rig via a waypoint such as a GPS position, an offset direction (right or left), an offset distance (for example $\frac{1}{8}$, $\frac{1}{4}$, $\frac{1}{3}$, or $\frac{1}{2}$ mile), a desired final approach inbound course (for example into the wind), and a Minimum Descent Height (MDH). The offshore approach mode 52 then builds all other associated waypoints such as the Turn Point (TP); Initial Approach Fix (IAF); Final Approach Fix (FAF); and Missed Approach Point (MAP) to accomplish the RIG approach (FIGS. 4A and 4B). The offshore approach mode 52 uses aircrew entered information to maneuver the aircraft onto the desired final approach course, descend to the desired height above water, follow the desired inbound course, and slow the aircraft to the published rig landing speed. The offshore approach mode 52 also includes a coupled go around mode if the rig is not sighted or the aircraft is not in a position to land at the missed approach point. The offshore approach mode 52 thereby facilitates precise all weather, automatic offshore approaches to an offshore facility such as an oil rig landing platform.

In one operational example, the MSP 44 (FIG. 5A) is displayed as would be viewed prior to initiation of the offshore approach mode 52. The offshore approach mode 52 of the MSP 44 may be accessed when LNAV is the selected navigation mode.

Figure 5C:
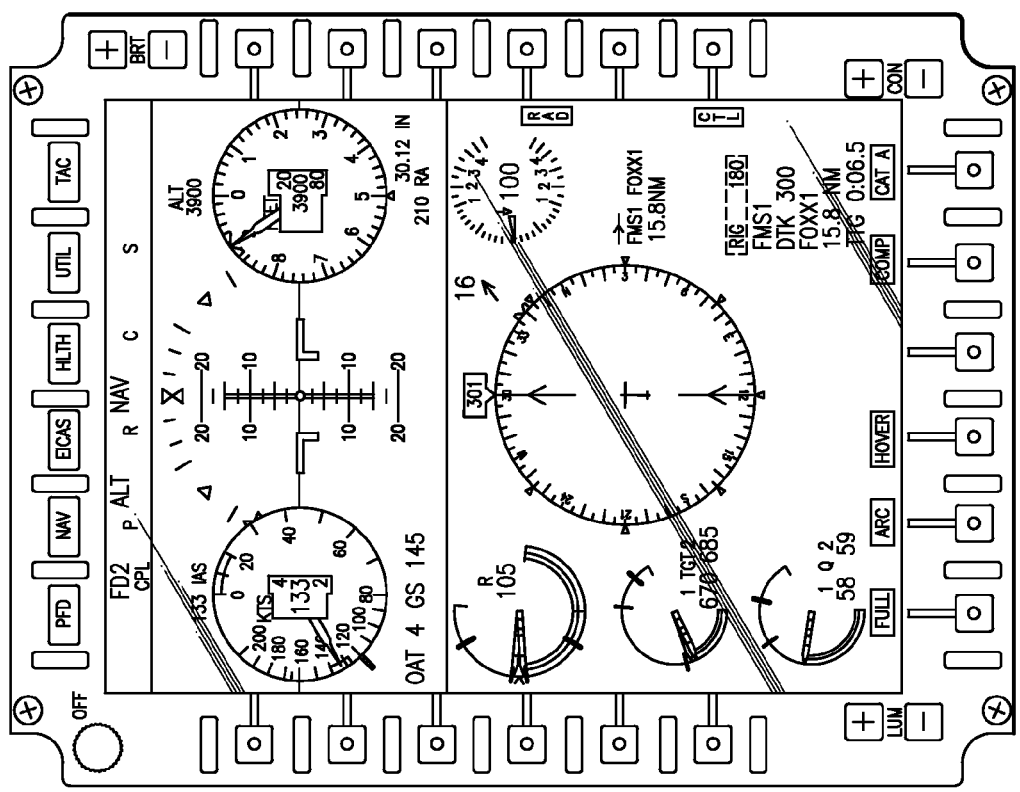
FIG. 5C is view of a PFD page prior to activation of the offshore approach mode.
Figure 5B:
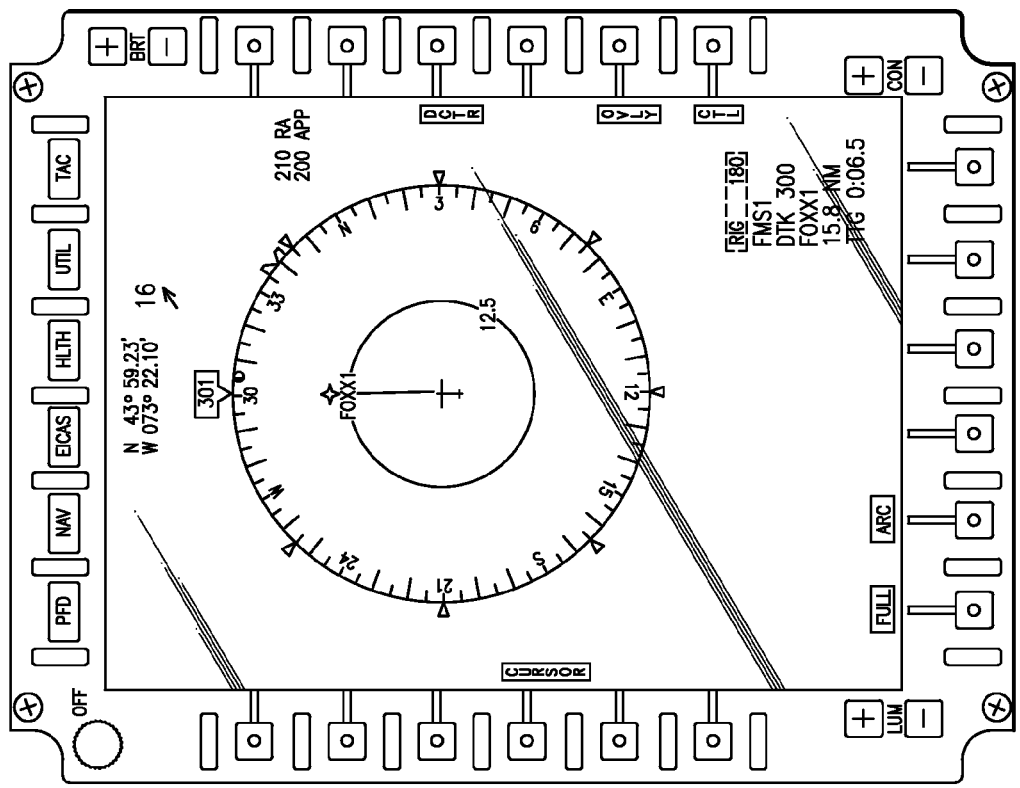
FIG. 5B is view of a NAV page prior to activation of the offshore approach mode.

The MFD 42 provides the information required to monitor the progress of the offshore approach mode 52. Prior to activation of the offshore approach mode 52, the respective NAV page 42P#1 (FIG. 5B) and PFD page 42P#2 (FIG. 5C) which corresponds with the MSP 44 (FIG. 5A) is illustrated. The aircraft is currently on an automatic flight plan toward the rig location FOXX1 (illustrated by the star symbol; FIG. 5B). "FMS 1" designates the FMS 46 currently used for navigation.

The aircraft can be configured with a multiple of FMS 46 systems. When configured with two FMSs, the aircrew may choose to use either FMS 1 or FMS 2. The selected FMS ("FMS1") is shown on the respective NAV page 42P#1 (FIG. 5B) and PFD page 42P#2 (FIG. 5C).

"FOXX1" is the arbitrary name given to the rig waypoint in the example as each waypoint is given a five digit alpha/numeric label. The active waypoint is shown on the respective NAV page 42P#1 (FIG. 5B) and PFD page 42P#2 (FIG. 5C).

The aircrew utilizes the FMS 46 (also illustrated in FIG. 5D) to build the aircraft flight plan (Action 200). The aircrew may build the flight plan prior to takeoff by insertion of waypoints into the FMS 46. The flight plan is a list of points (waypoints) that the aircraft will fly over en-route to the destination. The destination is usually the last waypoint in the flight plan. The "active waypoint" is the waypoint the aircraft is actively flying to at the time. The aircrew readily determines the active waypoint from the FMS 46, the respective NAV page 42P#1 (FIG. 5B) or PFD page 42P#2 (FIG. 5C) on the MFD 42. The location of the oil rig is input via a waypoint such as a GPS position which may be designated by setting the rig location waypoint on the FMS flight plan for communication to the FCC 22. The geographic coordinates of the oil rig (latitude and longitude) may be stored in a "company data base" in the FMS 46 or the memory 50B for selection by the aircrew. The company data base may include a stored list of all the local oil rigs which may be selected by the operator.

Figure 5E:
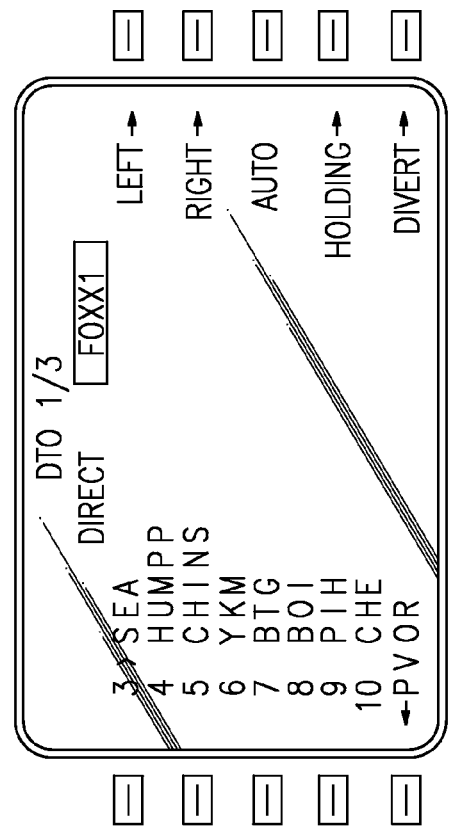
FIG. 5E is view of a "direct to" page with the waypoint FOXX1 selected on the Flight Management System of FIG. 5D.
Figure 5D:
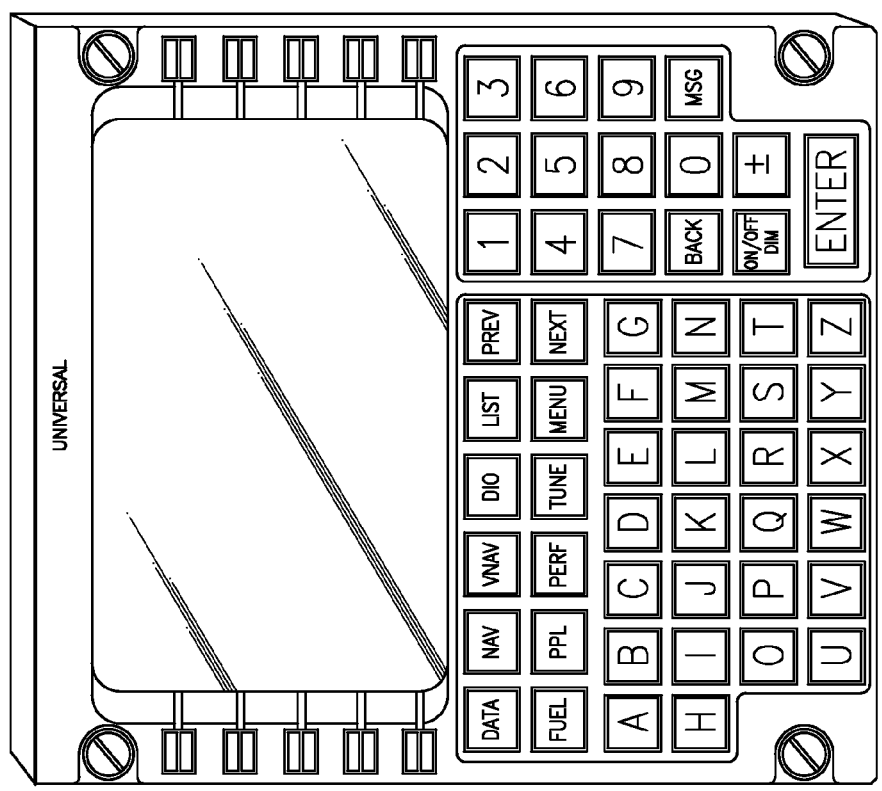
FIG. 5D is view of a Flight Management System for use with the offshore approach mode.

To build the flight plan, the aircrew pushes the flight plan (FPL) button on the FMS 46 (FIG. 5D). The aircrew may then type in each waypoint and select ENTER to add the waypoint to the flight plan. A typical flight plan may consist of a multiple of different waypoints. Once the entire flight plan is built, the pilot pushes the NAV button. It should be understood that other avionic systems which allow and aircrew to build a flight plan may alternatively or additionally be utilized other than the disclosed UNS-1 Flight Management System.

If a flight plan has not been built, or the desired oil rig is not the active waypoint, the pilot can designate the active waypoint by using the "direct to" (DTO) function. To accomplish this, the aircrew pushes the DTO button on the FMS 46 and either types in the rig waypoint identifier or selects the waypoint from a list, then pushes the ENTER button. FIG. 5E schematically shows an example "direct to" page with the waypoint FOXX1 selected.

The offset direction may then be set on the MSP 44 by pushing the "SIDE" soft key on the interface device 44I to either the L (left) or R (right) selection (R displayed). The offset distance is also set by pushing the "OFST" soft key until the desired distance is shown displayed. Each successive push of the "OFST" soft key will cycle through 0.12, 0.25, 0.33, and 0.50 nautical miles.

Figure 5F:
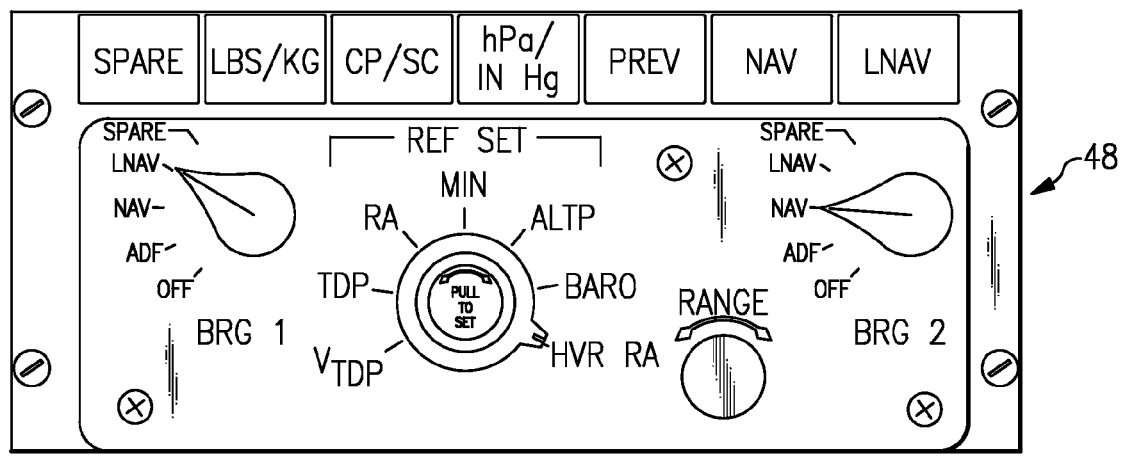
FIG. 5F is view of a Display Control Panel for use with the offshore approach mode.

The final approach inbound course is then set. The final approach inbound course may be determined with regard to a reported wind direction. The reported wind direction may be obtained through communication with the oil rig. To set the final approach inbound course in this described example, the LNAV key on the Display Control Panel 48 (also illustrated in FIG. 5F) is pressed until FMS 1 is the selected navigation source as illustrated on the respective NAV page 42P#1 (FIG. 5B) and PFD page 42P#2 (FIG. 5C). The PREV key is then activated on the Display Control Panel 48 until RIG is the selected previewed source as illustrated on the respective NAV page 42P#1 (FIG. 5B) and PFD page 42P#2 (FIG. 5C). The appropriate course knob is then turned on the Remote Instrument Controller (RIC) 42Ib (also illustrated in FIG. 5G) until the desired final approach inbound course is shown as illustrated on the respective NAV page 42P#1 (FIG. 5B) and PFD page 42P#2 (FIG. 5C). In this example, the RIG preview mode shows a final approach inbound course of 180°.

The respective NAV page (FIG. 5B) and PFD page (FIG. 5C) indicates the aircraft is heading toward the rig location waypoint FOXX1 along a desired track (DTK 300), with an identified distance (15.8 NM) and a time to go (TTG 0:06.5). It should be understood that additional or alternative navigation information may be displayed.

Figure 5G:
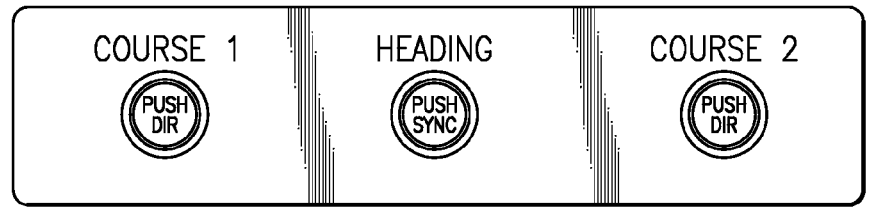
FIG. 5G is view of a Remote Instrument Controller for use with the offshore approach mode, the Remote Instrument Controller operable to set a desired final approach inboard course.

The Minimum Descent Height (MDH) is also set via the Display Control Panel (DCP) 48. The REF SET knob (center knob; FIG. 5G) has outer and inner adjustment knobs. HVR RA (radar) is selected on the outer adjustment knob and the inner adjustment knob is set to the desired Minimum Descent Height (MDH) next to "APP" on the NAV page 42P#1 (FIG. 5B). In this operational example, an MDH of 200 feet is a selected. The selected MDH may alternatively or additionally be displayed in white text under the NAV page radar altimeter and via a white bug on the altitude gauge (FIG. 5B). The HVR RA selection (MDH) is operable to set the altitude above the water that is to be the final descent altitude used by the FCC for the level-off at the end of the descent. When the PFD radar altimeter is selected, the MDH may also be shown on the PFD (FIG. 5C). It should be understood that other avionic system which allow an aircrew to set a minimum descent height in an autopilot system may alternatively or additionally be utilized.

Figure 6A:
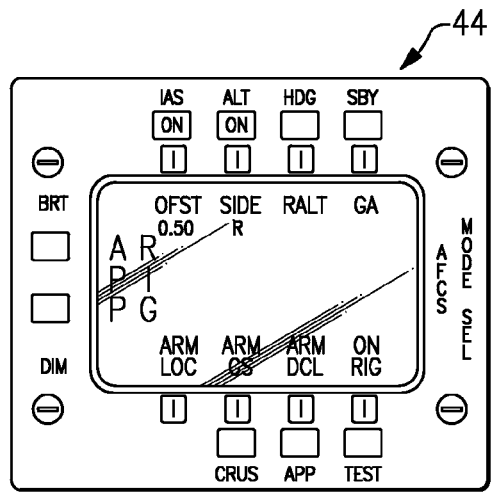
FIG. 6A is a schematic view of a Mode Select Panel MSP displayed as would be viewed immediately after activation of the offshore approach mode.
Figure 6C:
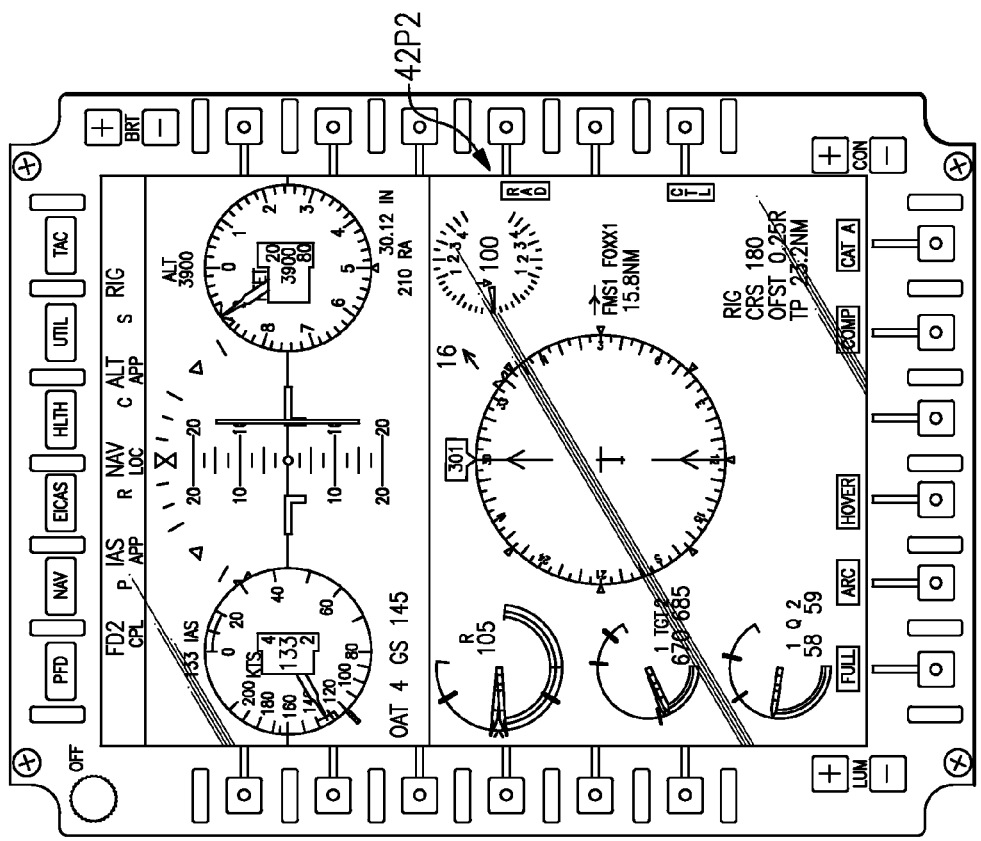
FIG. 6C is view of a PFD page immediately after activation of the offshore approach mode.

FIG. 6A illustrates the RIG approach page of the MSP 44 immediately after approach initiation but prior to localizer intercept (Action 210; FIG. 3). The selected waypoint (RIG); inbound course (CRS 180); offset distance and direction (OFST 0.25 R); and next approach point and distance to the next approach point (TP 23.2 NM) in the approach is displayed on the NAV page 42P#1 (FIG. 6B) and PFD page 42P#2 (FIG. 6C).

Figure 6B:
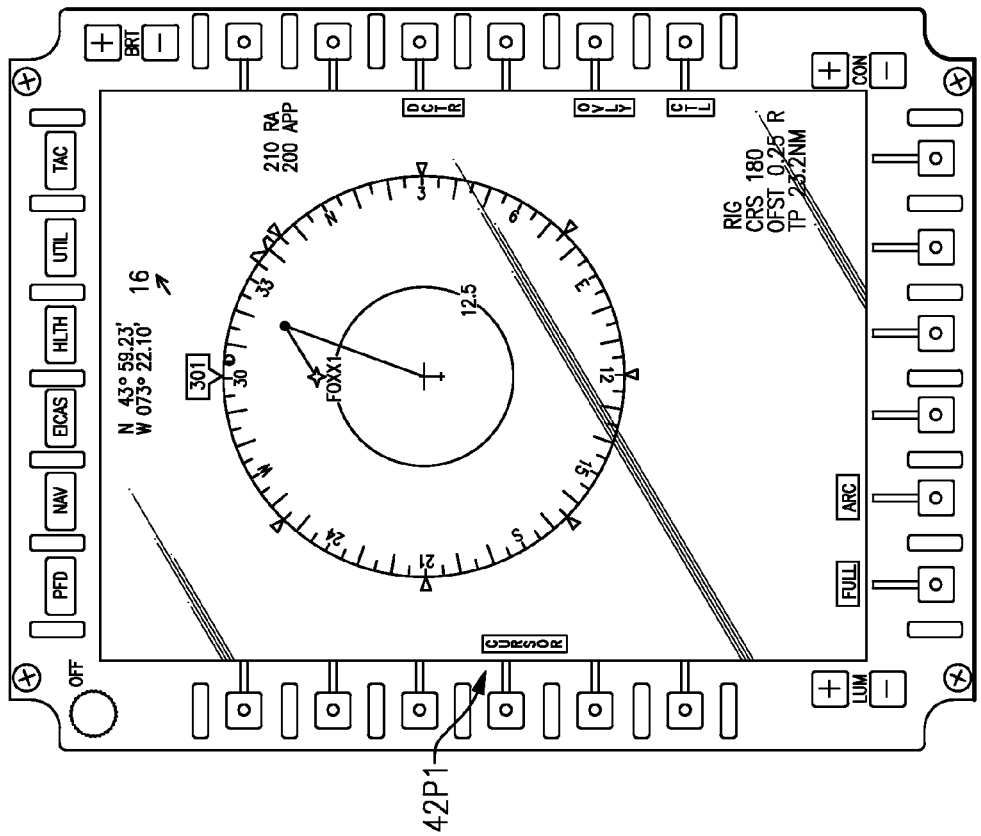
FIG. 6B is view of a NAV page immediately after activation of the offshore approach mode.

Referring to FIG. 6B, a simplified approach pattern is shown on the NAV page. As the offshore approach mode 52 is now activated, a stick map on the NAV page details the approach route. If the aircraft is more than, for example, approximately 22 miles from the Turn Point (TP), the stick map will draw a simple line from the aircraft to the TP and then to the rig waypoint (FOXX1).

Figure 7B:
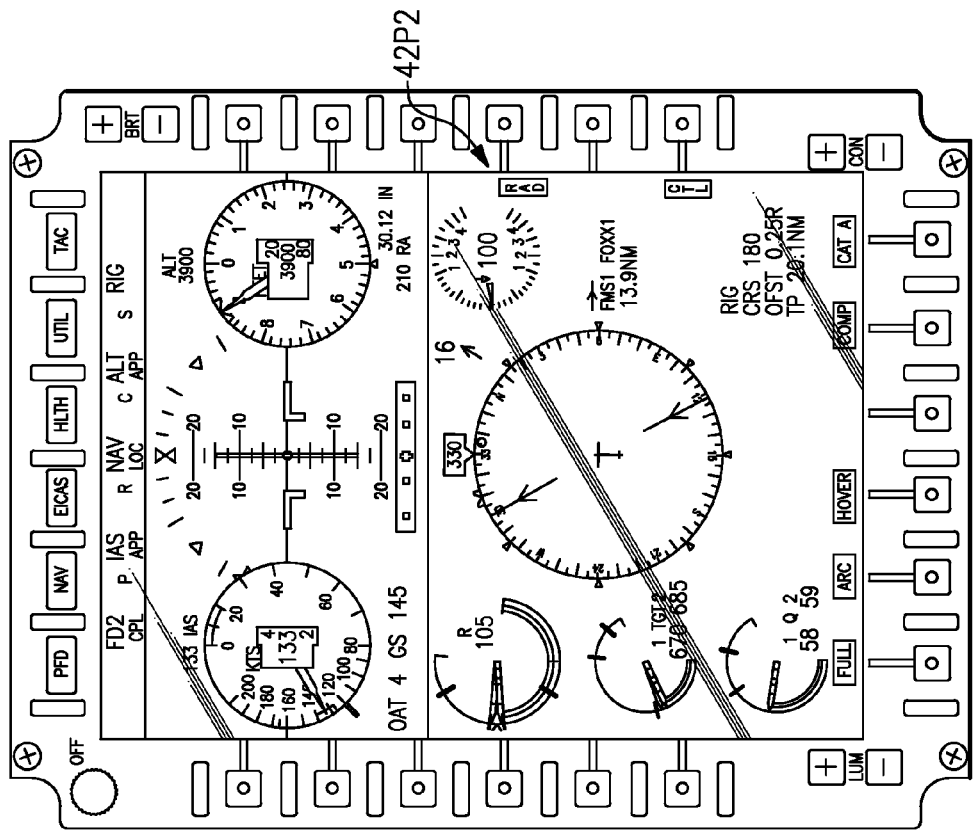
FIG. 7B is view of PFD 20.1 miles from the turn point.
Figure 7A:
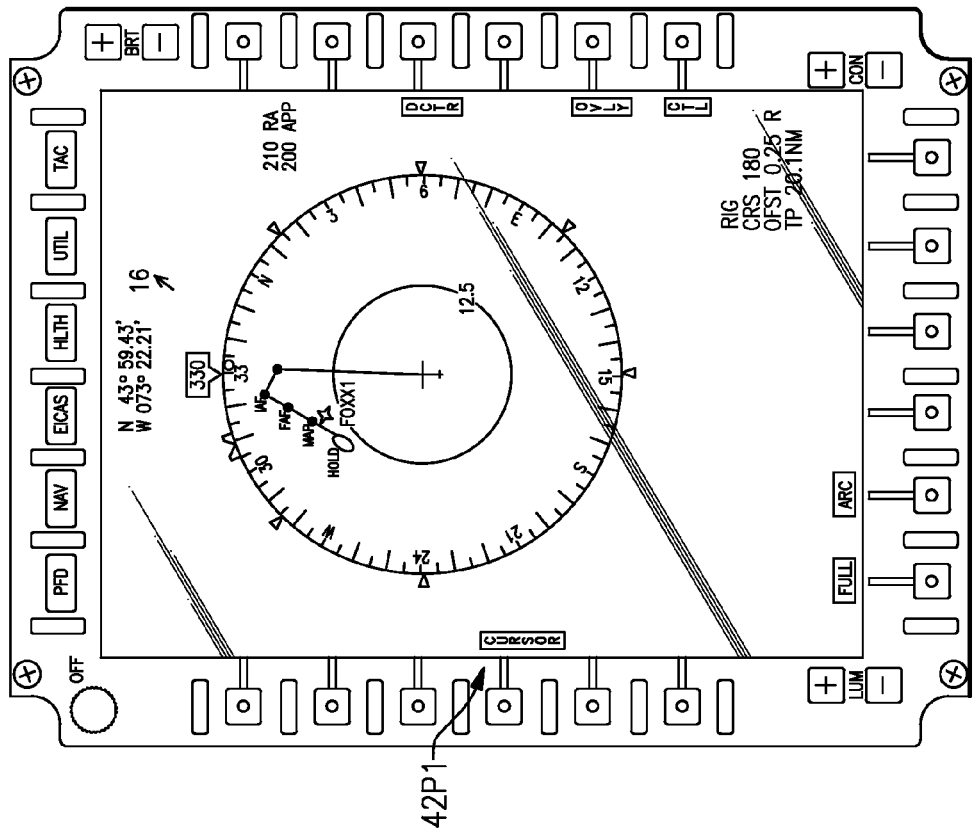
FIG. 7A is view of NAV page 20.1 miles from the turn point.

Referring to FIGS. 7A and 7B, the respective NAV page 42P#1 and PFD page 42P#2 are illustrated 20.1 miles from the Turn Point (TP). As the aircraft closes within, for example, approximately 22 miles of the turn point, the stick map will show blue boxes for the Turn Point (if required), Initial Approach Fix (IAF); Final Approach Fix (FAF); and Missed Approach Point (MAP). The HOLD pattern is shown via a symbol such as a blue oval. The projected aircraft course connects the points via, for example, a magenta line. Notably, the #1 bearing pointer is selected to FMS1 and thus continues to give azimuth and range to the rig waypoint (FOXX1).

Figure 8B:
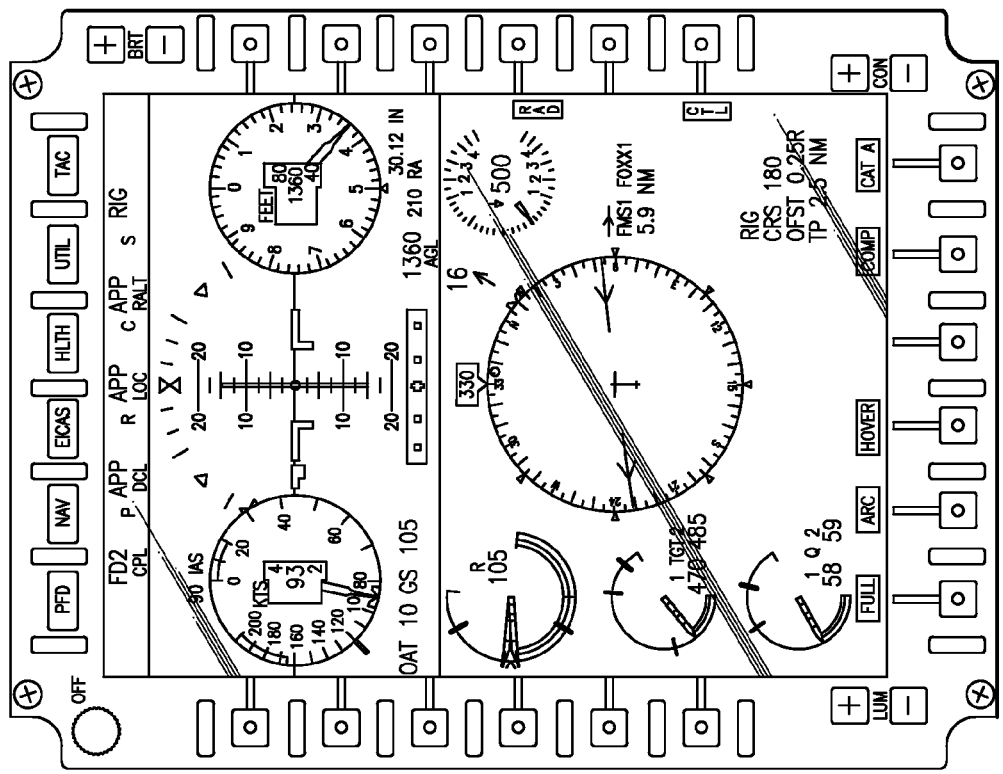
FIG. 8B is view of a PFD page 2.5 miles from the turn point.
Figure 8A:
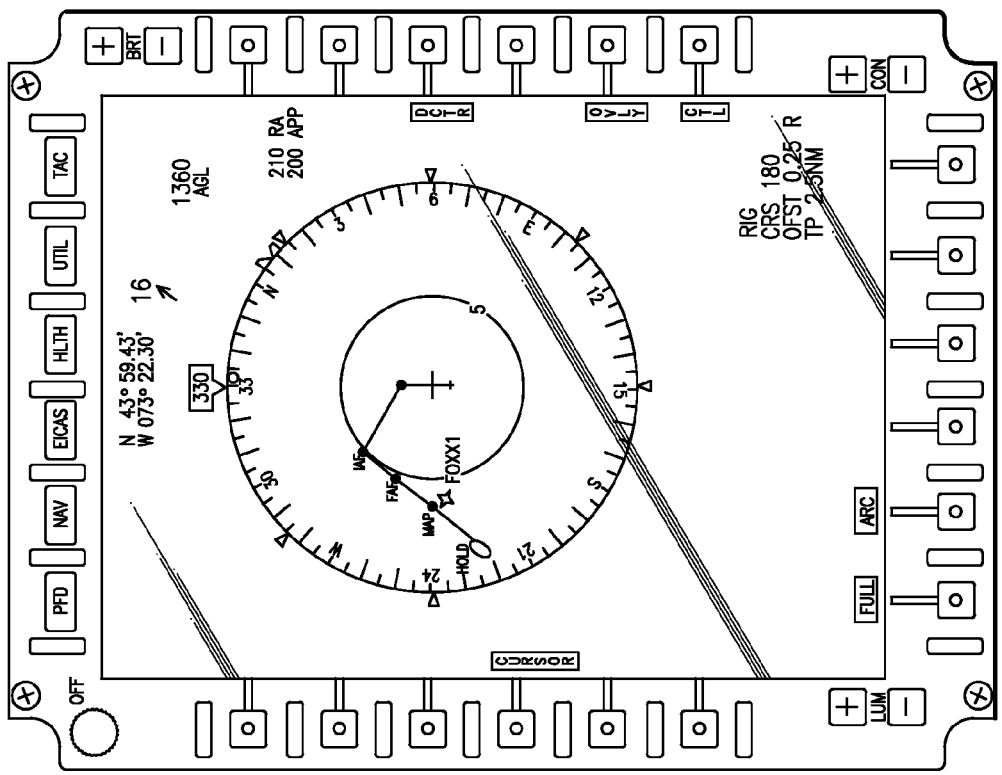
FIG. 8A is view of a NAV page 2.5 miles from the turn point.

Referring to FIGS. 8A and 8B, the respective NAV page 42P#1 and PFD page 42P#2 are illustrated 2.5 miles from the Turn Point (TP). The aircraft is descending to 1,500 ft AGL and decelerating to 80 KIAS (Action 220; FIG. 3). The offshore approach mode 52 descent rate in the non-limiting embodiment sets a multiple of values as a function of groundspeed so that the descent toward the Turn Point (TP) through space may not result in a straight glideslope line drawn from the intended lower end point up to the intercept altitude. The initial approach phase for the offshore approach mode 52 may utilize a Search and Rescue (SAR) control law mode to intercept the pattern altitude, 1500 ft and 80 kts in the disclosed non-limiting embodiment (FIG. 4B). In this operational example, a SAR type approach known as an approach to a point is used except at the end condition in which, instead of a low hover, the end condition is set to be the Turn Point (TP) at 1500 feet and 80 kts. The speed condition is set to be airspeed or groundspeed dependant in part on wind so as to not to be below 80 kts groundspeed. Unlike conventional glideslopes the offshore approach mode 52 defines the end of the glide slope specific to the oil rig waypoint, i.e. the descent altitude set by the aircrew and the 30 kt groundspeed.

Figure 9:
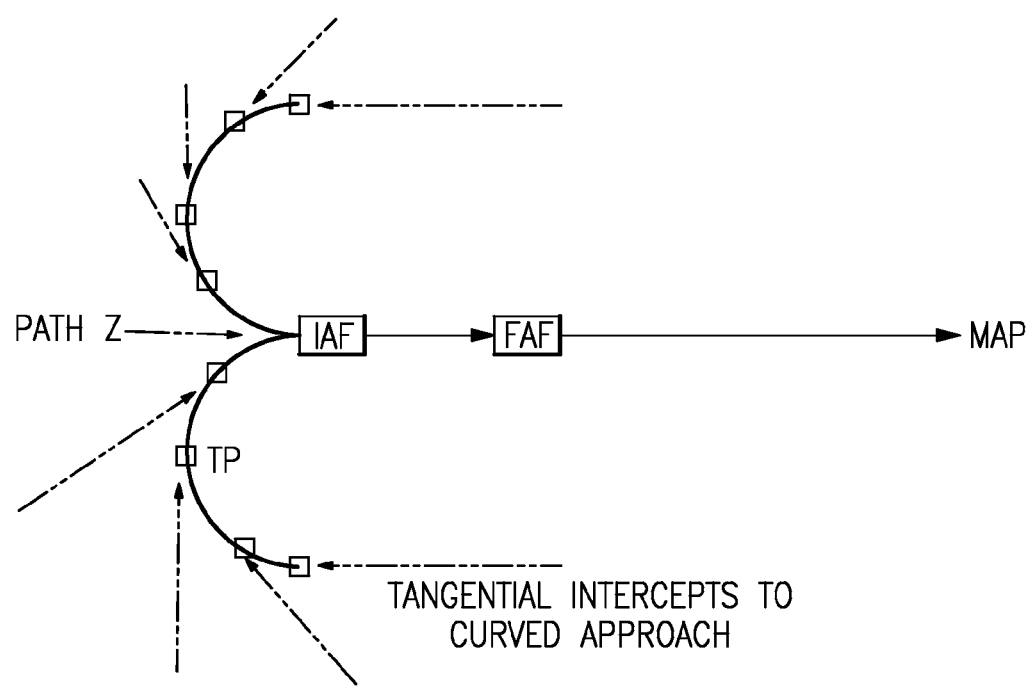
FIG. 9 is a schematic view of a curved approach procedure to align the aircraft with the final approach course with the offshore approach mode.

Referring to FIG. 9, the offshore approach mode 52 uses a curved approach procedure to align the aircraft with the final approach course (Action 230; FIG. 3). The curved approach procedure is defined by the schematic arcs shown in FIG. 9. The schematic arcs are representative of a standard rate turn radius at 80 knots. The offshore approach mode 52 for the turn to the Initial Approach Fix (IAF) in one non-limiting embodiment is based nominally on a standard rate turn function with adjustment of the turn rate and bank angle so as to arrive at the Initial Approach Fix (IAF) tangentially and with minimal crosstrack error even in high crosswinds, up to a predetermined maximum permitted bank angle. When aligning to the final approach course, the aircraft tangentially intercepts the appropriate arc, at least in part relative to aircraft position, and follows the arc to the Initial Approach Fix (IAF). The offshore approach mode 52 increases/decreases bank angle to maintain position on the arc up to a maximum bank angle of 25° in this non-limiting embodiment.

Alternatively or in addition thereto, groundspeed may be utilized for the basis of the turn arcs instead of airspeed as a function of bank angle vs. speed and turn rate. An auto-adjust airspeed function may also be incorporated in response to relative wind as the aircraft turns onto the final course. That is, the offshore approach mode 52 may control deceleration in the disclosed non-limiting embodiment so as to maintain at least the 80 kt groundspeed such that during the turn into the wind on final, airspeed is automatically adjusted to achieve the 80 kt groundspeed on the final. The aircraft does not slow down due to a headwind and the approach timeline is efficiently maintained. Once the approach is initiated, the aircraft will fly directly to the Turn Point (TP) which is the point of tangential intercept on the appropriate arc. If the aircraft is nearly aligned with the final approach course when the approach is initiated (path Z), the aircraft will fly proceed directly to the Initial Approach Fix (IAF), for example, descending at no more than 750 fpm to arrive at the Initial Approach Fix (IAF) at 1,500 feet AWL. The IAS reference is adjusted so that the aircraft arrives at the Initial Approach Fix (IAF) at 80 KGS in this non-limiting embodiment.

Offset direction and distance may be changed during the initial portion of the approach. Changing offset direction and distance will also change the position of the Turn Point (TP). Change of offset direction and distance is prevented when, in this non-limiting embodiment, within approximately 3 miles of the Turn Point (TP). The MDH can be adjusted until within approximately 3 miles of the Initial Approach Fix (IAF) as long as the descent or decel commands have not initiated. The rig location or selected inbound final approach course cannot be adjusted after the rig approach is activated.

Figure 10B:
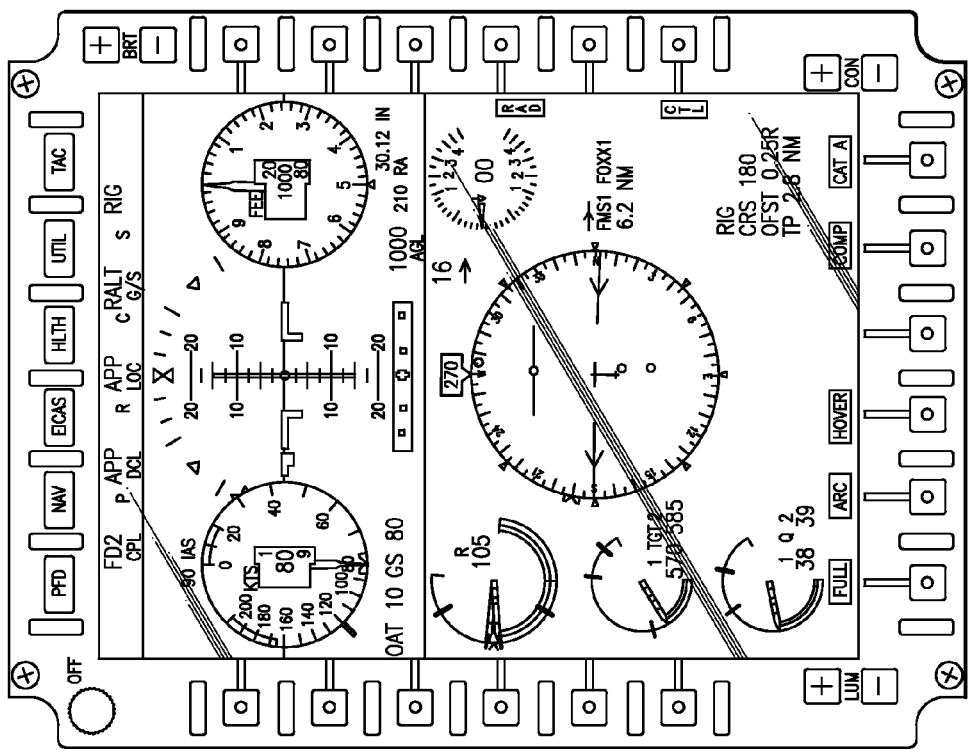
FIG. 10B is view of a PFD page past the turn point.
Figure 10A:
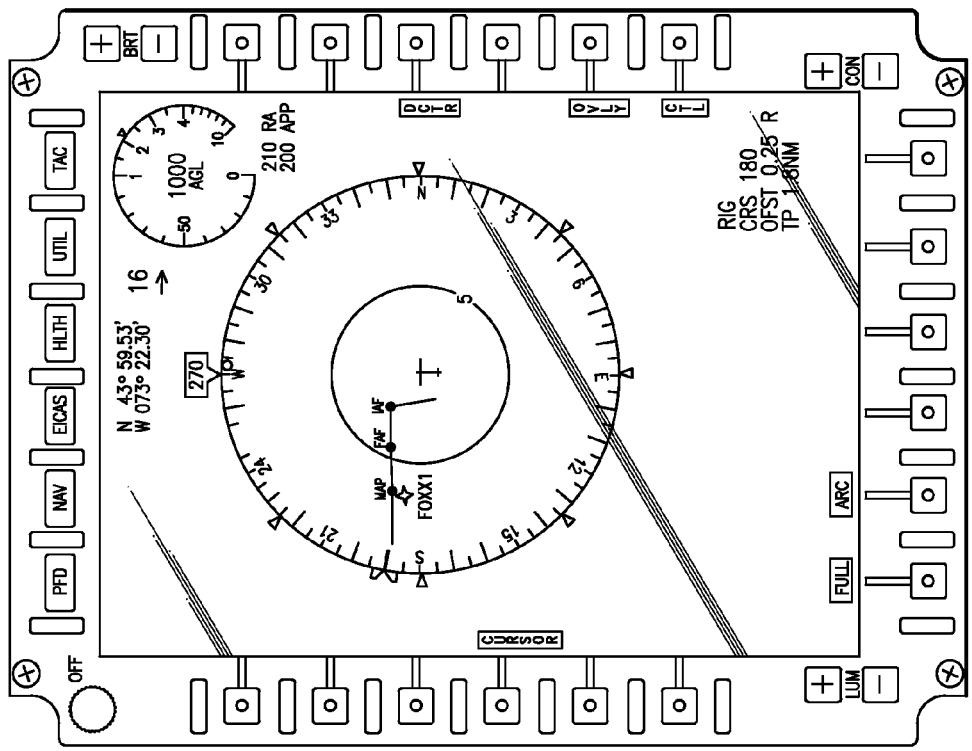
FIG. 10A is view of a NAV page past the turn point.

Referring to FIGS. 10A and 10B, the respective NAV page 42P#1 and PFD page 42P#2 are illustrated with the aircraft past the Turn Point (TP) (Action 240; FIG. 3). The aircraft is transitioning to a constant 80 KGS, maintaining 1,500 ft AGL and maneuvering towards the inbound course. The inbound course or localizer is illustrated by the course deviation bar. The localizer course is offset to either side of the oil rig to permit the un-obstructed go around path. The direction of offset (left or right) and the distance of offset (⅛, ¼, ⅓, or ½ nautical mile) was earlier selected by the aircrew.

A PFD banner on the PFD page 42P#2 lists the current function of each coupled axis: Pitch ("P" field); Roll ("R" field); Collective ("C" field) and the armed function, and also the general task of the CFD ("S" field). It should be understood that the PFD banner will change as the mode changes throughout the RIG approach. As long as the rig approach is active, the S field will show RIG.

The Pitch axis (P), as shown on this page, is coupled to the approach mode (APP). The next automatic transition will be to the deceleration mode (DCL) which happens between the Final Approach Fix (FAF) and the Missed Approach Point. The possible pitch axis modes during a rig approach are:

| | |
|---|---|
| IAS | The aircraft is holding a constant indicated airspeed; |
| APP | The indicated airspeed will vary to ensure the higher of 80 KIAS or 80 KGS; |
| DCL | The aircraft is decelerating from 80 KGS to 30 KGS on final approach; |
| VHLD | The aircraft has captured 30 KGS just prior to the Missed Approach Point; and |
| GA | The aircraft is in the go around mode which provides a transition to and maintain 80 KIAS. |

The Roll axis (R), as shown on this page, is coupled to the approach mode. The next automatic transition will be to capture the localizer course. The possible Roll axis modes during a rig approach are:

| | |
|---|---|
| APP | The aircraft is maneuvering towards the localizer course; |
| LOC | The aircraft is tracking the localizer course; and |
| VHLD (or HOV) | The aircraft is following a aircrew requested lateral velocity |

The Collective axis (C), as shown on this page, is coupled to radar altitude. The next automatic transition will be to capture and maintain the glide slope at the Final Approach Fix (FAF). The possible Collective axis modes during a rig approach are:

| | |
|---|---|
| ALT | The aircraft is holding a constant barometric altitude; |
| APP | The aircraft is descending from the enroute altitude to the turn point altitude; |
| RALT | The aircraft is holding a constant radar altitude; |
| G/S | The aircraft is maintaining a constant glide slope on the final approach; and |
| GA | The aircraft is in the go around mode. It will transition to and maintain a 750 fpm climb. |

Figure 11B:
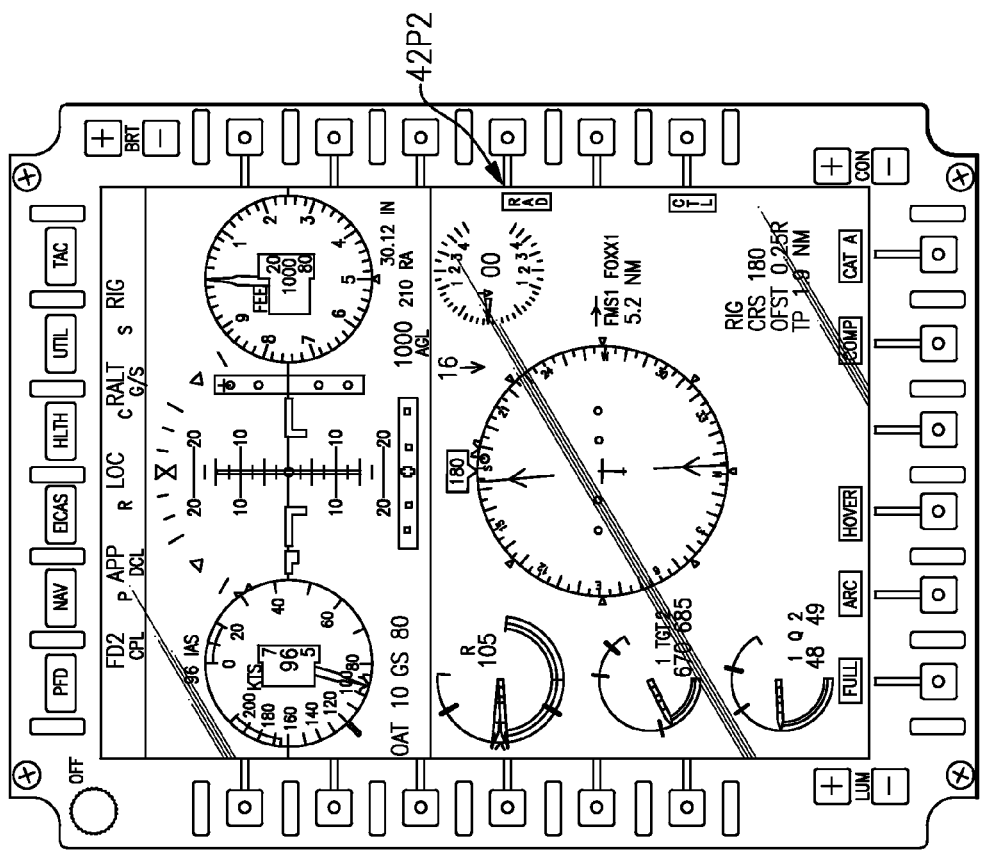
FIG. 11B is view of a PFD page between IAF and FAF.

After completing an initial turn toward the course to the Turn Point, the course to the TP and the lateral deviation from that course are shown on the Horizontal Situation Indicator (HSI). The course set toward the Turn Point (TP) and the deviation from that course is shown based on a set full scale distance from the course. When within a predetermined degree of the selected inbound course and within a predetermined mile of the Initial Approach Fix (IAF), a pseudo localizer course indication symbology is depicted on the Horizontal Situation Indicator (HSI). Full scale deviation of the HSI localizer equals a predetermined function of distance and degrees off course vs distance. Full scale deviation on the sensitive localizer below the attitude indicator equals a predetermined function of distance and degrees off course vs.

distance. The sensitivity function may be defined to provide less indicator sensitivity at the Initial Approach Fix (IAF) and greater sensitivity when close to the Missed Approach Point Referring to FIGS. 11A and 11B, the respective NAV page 42P#1 and PFD page 42P#2 are illustrated between IAF and FAF. The aircraft maintains 80 KGS and 1,500 ft AWL while capturing the localizer.

Figure 11A:
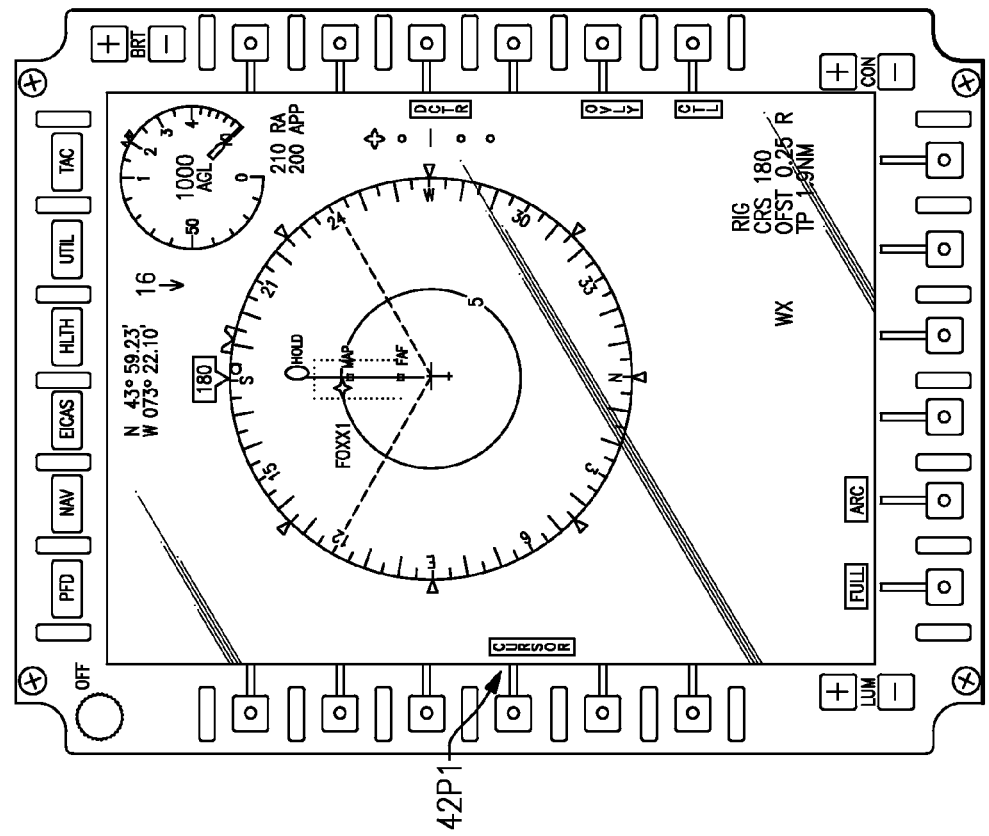
FIG. 11A is view of a NAV page between IAF and FAF.

The white dotted "radar safe area" is depicted on the NAV page (FIG. 11A). The NAV and PFD page range scales will automatically change when past the TP (or IAF for straight in approach: path Z; FIG. 9). The intent of auto range change is to maintain the end of the radar safe area in the upper portion of the display to provide the optimum radar view of the approach area and thereby identify unexpected obstacles such as ships. Such obstacles may have a height greater than the altitude of the aircraft and thereby prevent entry into the final approach portion of the approach. Auto ranging implementation is shown below.

| Distance from MAP (nm) | Display Range (nm) |
|---|---|
| 8 | 10 |
| 3 | 5 |
| 0.8 | 2.5 |
| GA activated | 10 |

Figure 12A:
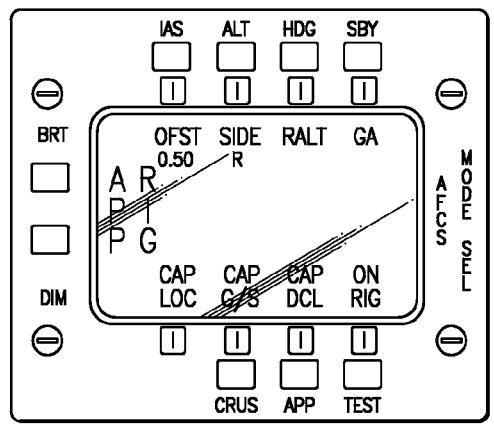
FIG. 12A is view of a PFD page inside the Final Approach Fix (FAF)
Figure 12C:
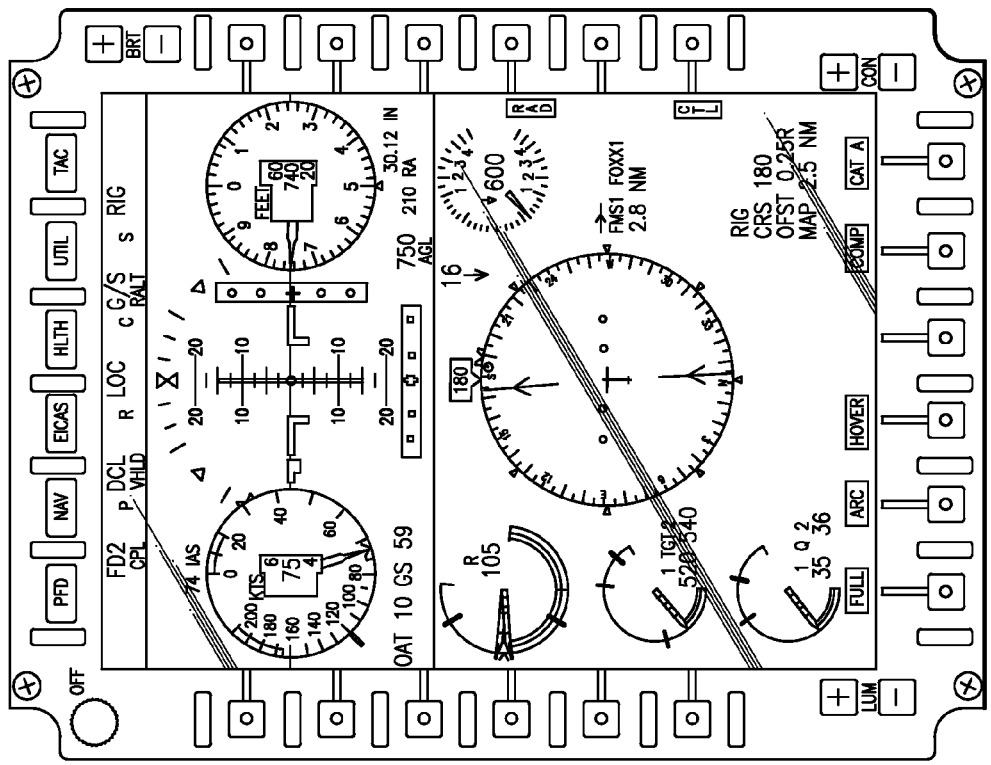
FIG. 12C is view of a PFD page inside the Final Approach Fix (FAF)
Figure 12B:
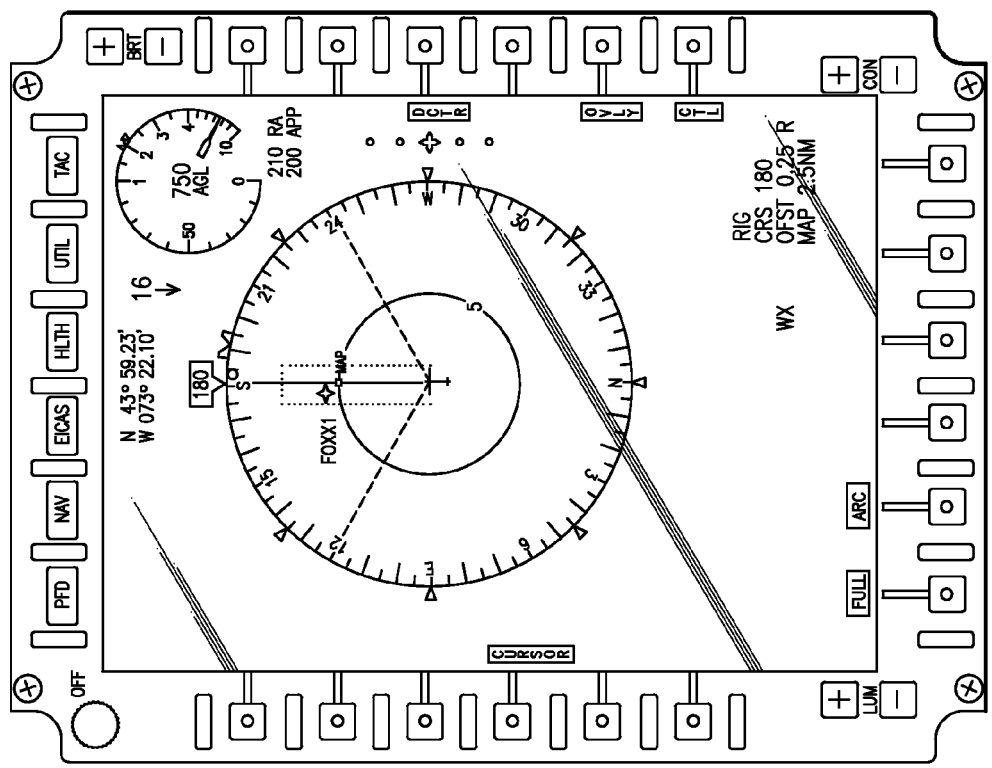
FIG. 12B is view of a NAV page inside the Final Approach Fix (FAF)
Figure 14A:
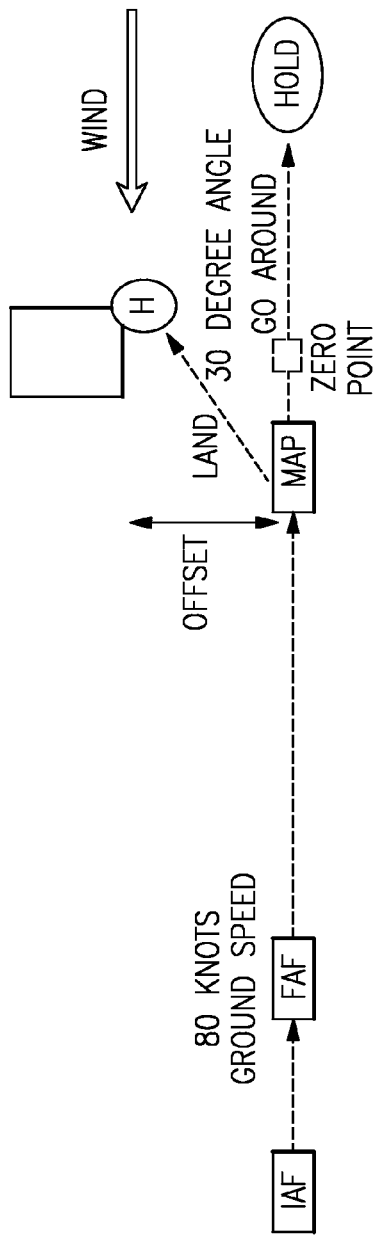
FIG. 14A is a schematic horizontal view of the flight plan inbound of the Initial Approach Fix (IAF) provided by the offshore approach mode.
Figure 14B:
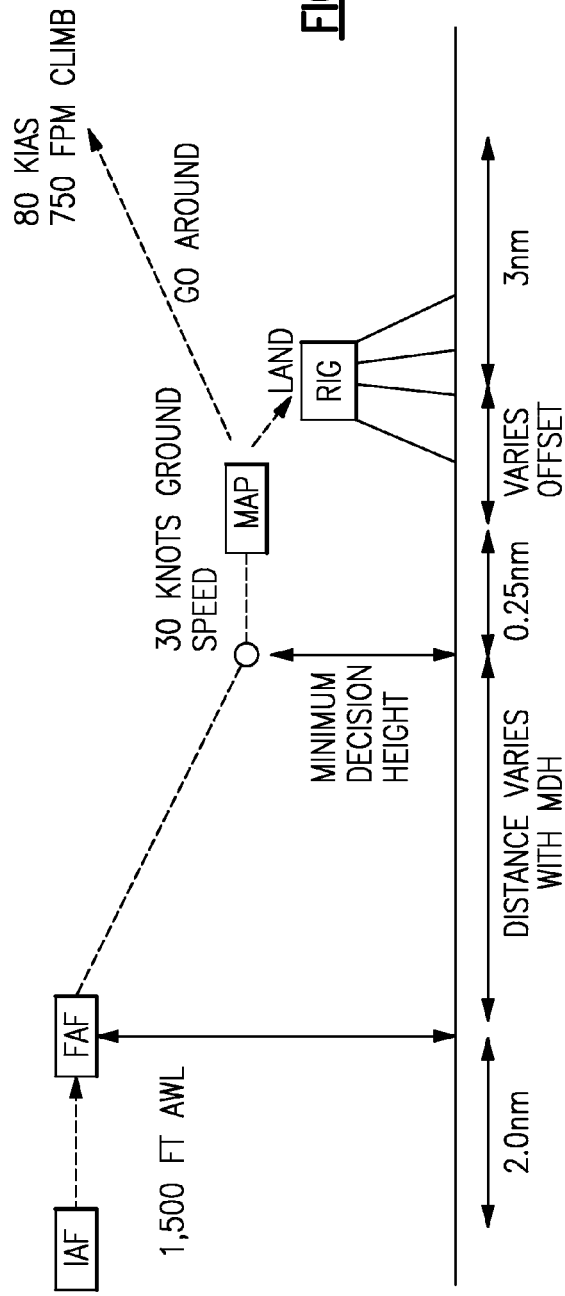
FIG. 14B is a schematic vertical view of the flight plan inbound of the Initial Approach Fix (IAF) provided by the offshore approach mode.

FIG. 12A illustrates the RIG approach page of the MSP 44 in the final approach portion of the offshore approach mode 52 (Action 250; FIG. 3). The respective NAV page (FIG. 12B) and PFD page (FIG. 12C) are illustrated during the final approach portion of the offshore approach mode 52. The NAV page also changes range to, for example, a 5.0 nm scale. The aircraft maintains the localizer and descends on the glide slope with deceleration to 30 KGS. If the aircrew elects to enter the pattern below 1,500 feet AWL, glide slope intercept will occur after the Final Approach Fix (FAF). The final approach portion of the offshore approach mode 52 essentially provides a constant angle type final approach with only the on-board aircraft flight control system 20. The glide slope is a calculated function of height above the water versus distance from the bottom of the glide slope (defined by the minimum descent height and the 30 kts deceleration end point; FIG. 14B). The offshore approach mode 52 calculates the function with the radar altitude and distance such that the glide slope descent is coordinated with the deceleration. The glide slope descent is coordinated with aircraft deceleration so that the minimum decision height is reached generally simultaneously to thereby minimize the time/distance needed in the approach. The glideslope angle is set to be 4 degrees in this operational example so as to be relatively steeper than customary airport approaches, but also to be gradual and permit good visibility.

Figure 13B:
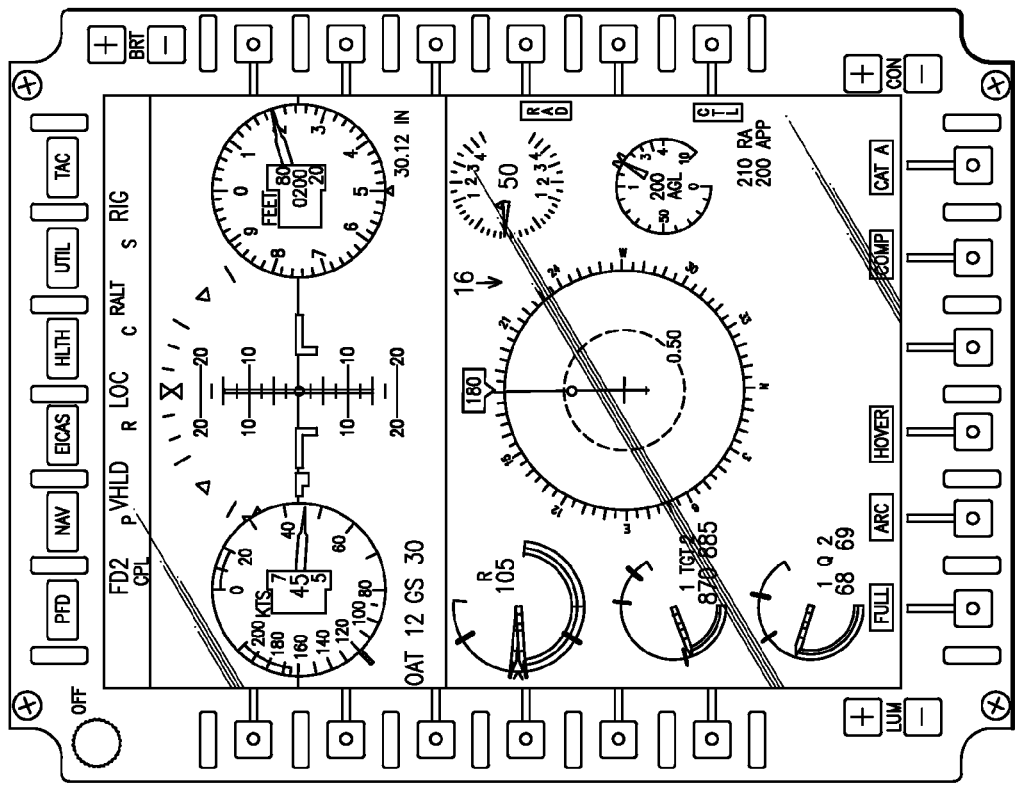
FIG. 13B is view of a PFD page just prior to MAP.
Figure 13A:
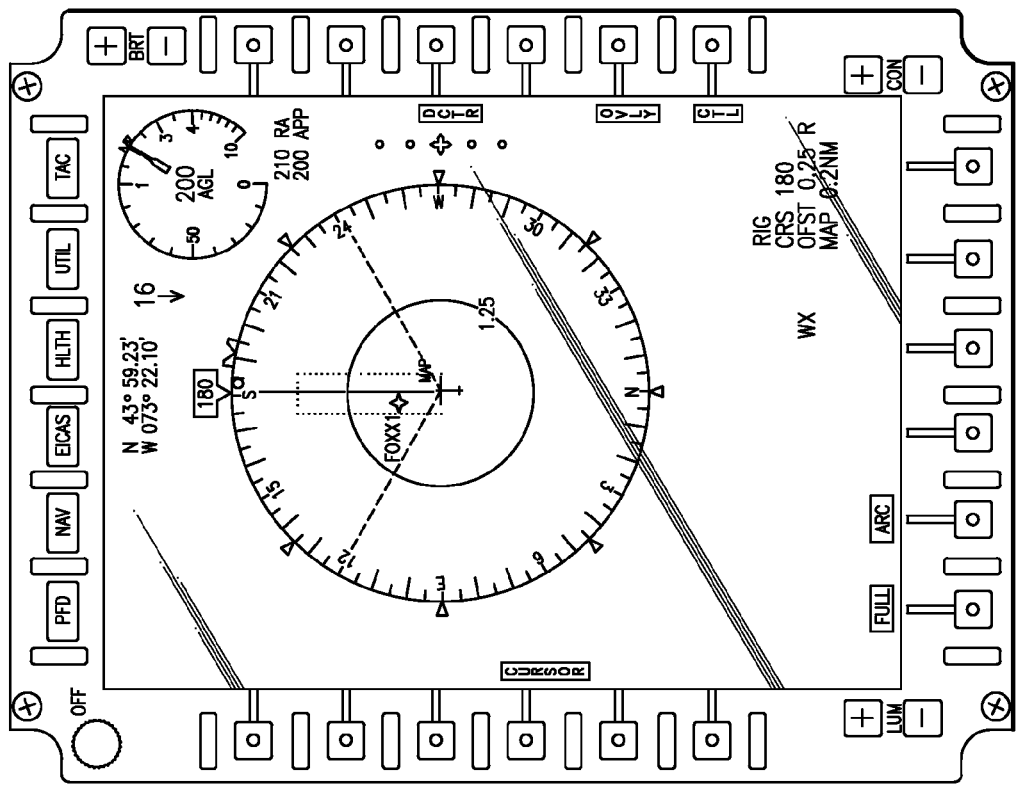
FIG. 13A is view of a NAV page just prior to MAP.

Referring to FIGS. 13A and 13B, the respective NAV page 42P#1 and PFD page 42P#2 are illustrated just prior to MAP (Action 260; FIG. 3). The aircraft maintains localizer, selected MDH (200 feet) and 30 KGS. The PFD page also changes to a HOVER page as the aircraft slows below 50 knots (air or ground speed). The NAV page range also change to 2.5 when 0.8 nm from the Missed Approach Point.

The PFD page 42P#2 also changes to the HOVER page 42P#3 which includes a hover display that illustrates an aircraft symbol, a localizer course line, the rig waypoint (RIG), a velocity vector and an acceleration ball (FIG. 13C). The FCC 22 commanded velocity (VREF) is also shown with the actual aircraft groundspeed. The hover display may provide specific symbology to facilitate approach, hover and landing/take-off. The HOVER page may include symbology that facilitates precise pilotage cueing in the approach to hover. In the disclosed, non-limiting embodiment, the HOVER page 42P#3 may include: reference to aircraft velocity, location relative to the planned landing area, altitude, and rate of descent. Trend information may also be provided to assist the aircrew in understanding what will be the future state of the aircraft. Additionally, the HOVER page may provide the aircrew with data fused symbology such that the aircrew is made aware of unsafe landing areas.

The HOVER page 42P#3 combines, inter alia: the distance (relative position between current aircraft position and desired landing point); the aircraft velocity (velocity vector); and the aircraft acceleration (acceleration ball movement relative velocity vector) information all on one display in a symbology format that improves approach, hover and landing/take-off.

The velocity trend is displayed by the acceleration ball which moves relative to an end of the velocity vector opposite the aircraft current position point. The acceleration ball may be color-coded to provide further indication of acceleration, such as, for example, green for below or on acceleration limits, yellow for close to acceleration limits or red for above acceleration limits. When the velocity vector and acceleration ball are contained within the auto deceleration constraint circle, automatic hover control is initiated.

The velocity vector, which extends from the current aircraft position point, extends and retracts in proportion to aircraft ground speed. The direction of the velocity vector is equal to the angle between the ground track of the aircraft center of mass and the aircraft centerline. The acceleration ball is referenced to the end of the velocity vector and displays the instantaneous acceleration rate of the aircraft, i.e., the first derivative of the velocity vector. With zero acceleration, the acceleration ball remains at rest over the end of the velocity vector). As the aircraft accelerates, the acceleration ball will displace relative to the end of the velocity vector a distance in proportional to the acceleration. The velocity vector will then extend to meet the acceleration ball as the aircraft velocity increases. The value of acceleration used to calculate the position of the acceleration ball is predictive acceleration which factors in instantaneous acceleration, control stick position, and flight control dynamics. For further understanding of other aspects of the Hover page and associated modes thereof, attention is directed to U.S. Pat. No. 7,091,881, entitled Integrated Hover Display With Augmented Approach To Hover Symbology Cueing For Degraded Visual Environmental Conditions which is assigned to the assignee of the instant application and which is hereby incorporated herein in its entirety.

The distance between the Initial Approach Fix (IAF) and a point perpendicular to the landing platform (zero point; FIGS. 14A and 14B) will vary in response to the selected MDH and offset. In one non-limiting embodiment, the Final Approach Fix (FAF) is the point where the glideslope begins from a 1500' pattern altitude and the bottom of the glideslope is set to be 0.25 nm back from the Missed Approach Point (MAP). The Initial Approach Fix (IAF) is set to be 2.0 nm back from the Final Approach Fix (FAF). Therefore, for a 100 foot MDH, for example, the distance between the Initial Approach Fix (IAF) and the Missed Approach Point is approximately 5.5 nm. The location of the Missed Approach Point varies with the offset as shown in a subsequent paragraph and therefore the Final Approach Fix (FAF), IAF and Turn Point will adjust accordingly. The aircraft will level off at the MDH and slow to 30 KGS no later than 0.25 nm prior to the Missed Approach Point. In this example, the distance between the Final Approach Fix (FAF) and the Missed Approach Point depends on the selected Minimum Descent Height (MDH) calculated as:

$$((1500-MDH)/\tan 4 \deg)/6076+2$$

Which results in the following example approximate values of:

| MDH (feet) | FAF to MAP (nm) |
|---|---|
| 100 | 3.5 |
| 500 | 2.6 |

If the aircraft is in a condition to land (visual contact with the landing pad), the aircrew decouples and proceeds visually to landing platform (Action 270; FIG. 3). If, however, the aircraft is not in a condition to land, the aircrew pushes the Go Around (GA) button on either the cyclic control or the MSP 44 (FIG. 15A).

Figure 15A:
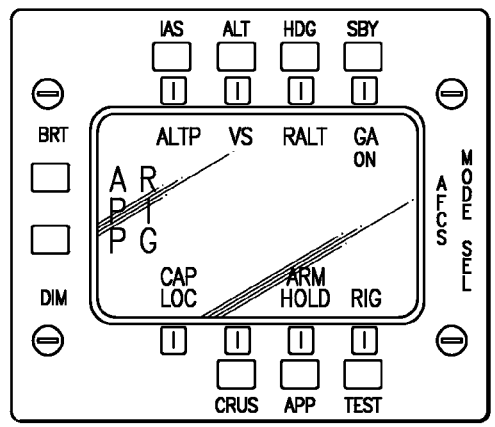
FIG. 15A is a schematic view of a Mode Select Panel MSP displayed as would be viewed during a go around maneuver of the offshore approach mode.
Figure 15C:
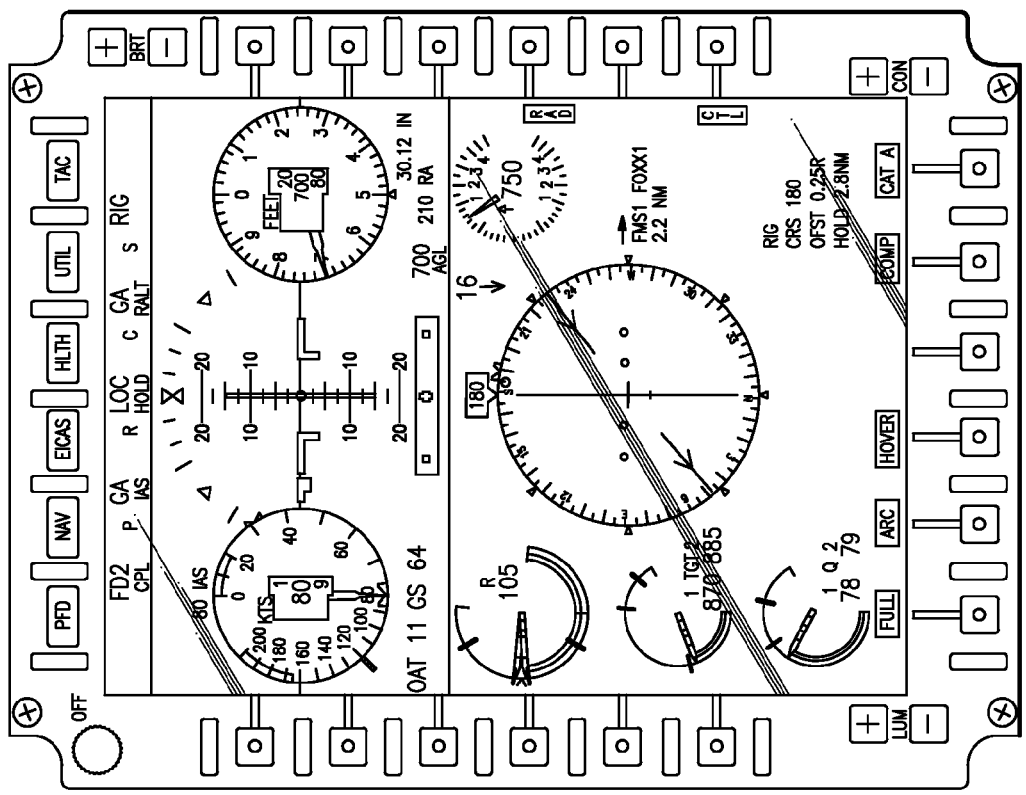
FIG. 15C is view of a PFD page during a go around maneuver of the offshore approach mode.
Figure 15B:
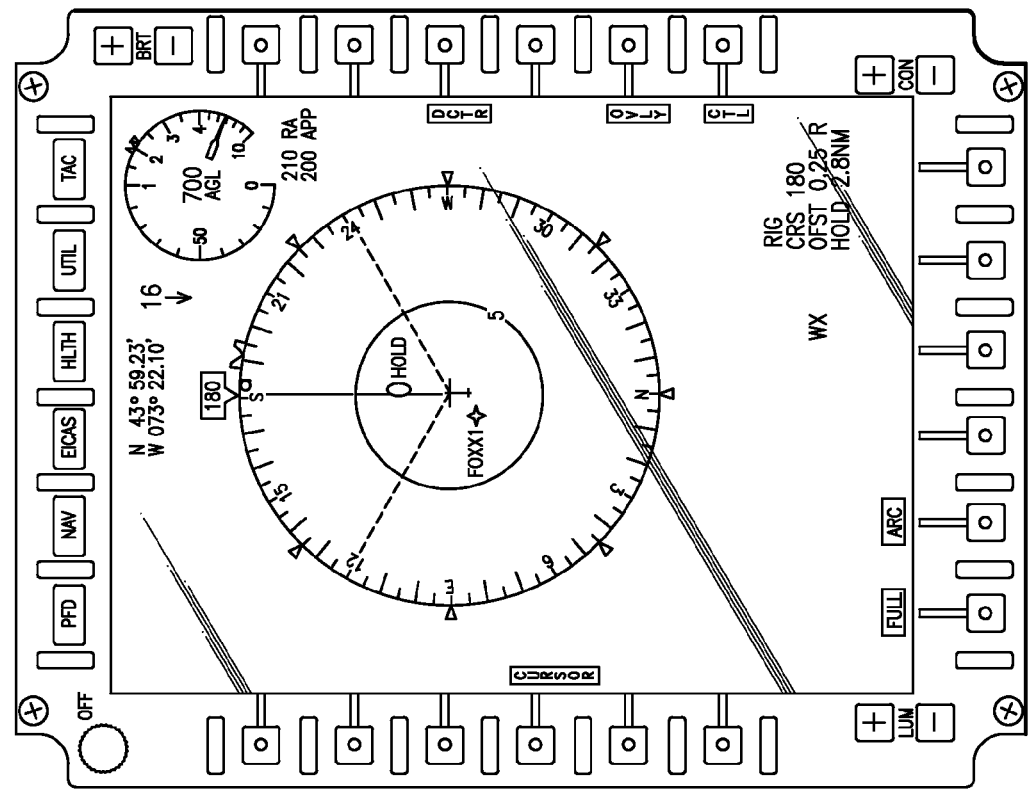
FIG. 15B is view of a NAV page during a go around maneuver of the offshore approach mode.

FIG. 15A illustrates the go-around maneuver subsequent to the RIG approach page of the MSP 44 (Action 280; FIG. 3). The respective NAV page 41P1 (FIG. 15B) and PFD page 46P2 (FIG. 15C) are illustrated in the go-around maneuver. The aircraft climbs at 80 KIAS and 750 FPM while maintaining localizer. NAV range changes to 10 nm. The PFD changes back to previously selected page (FULL or ARC) when accelerating through 65 KIAS.

The Missed Approach Point (MAP) is on the inbound course line at a 30° angle from the rig waypoint. The distance from the Missed Approach Point (MAP) to the zero point and the rig will depend on the offset distance.

| Offset (nm) | MAP to zero point (nm) | MAP to rig (nm) |
|---|---|---|
| 0.12 | 0.22 | 0.25 |
| 0.25 | 0.43 | 0.50 |
| 0.33 | 0.58 | 0.66 |
| 0.50 | 0.87 | 1.00 |

The rig approach mode automatically flys the described profile without aircrew intervention from approach initiation to the Missed Approach Point (MAP) and then through the missed approach and subsequent holding pattern if necessary. If desired, the aircrew can modify the approach via the cyclic and collective trim controls (FIG. 16).

The aircrew inputs the location of the oil rig, the desired inbound course (into the wind), the desired offset direction (right or left), the desired offset distance (⅛, ¼, ⅓, or ½ mile), and the minimum descent height. The onboard flight control computers use the aircrew entered information to maneuver the aircraft onto the desired final approach course, descend to the desired height above water, follow the desired inbound course, and slow the aircraft to the published rig landing speed (30 knots ground speed). The system includes a coupled go around mode if the rig is not sighted or the helicopter is not in a condition to land at the missed approach point.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A method to facilitate approach of a VTOL aircraft to an offshore facility comprising:
    inputting a waypoint for a landing platform of an offshore facility into an aircraft module;
    inputting an offset distance from the landing platform into the aircraft module;
    inputting a final approach inbound course toward the landing platform into the aircraft module;
    inputting a Minimum Descent Height (MDH)for a final descent toward the landing platform into the aircraft module;
    determining an Initial Approach Fix (IAF) and a Final Approach Fix (FAF) in response to the waypoint, the offset distance, the final approach inbound course, and the Minimum Descent Height (MDH)with the aircraft module; and
    directing the aircraft to the Initial Approach Fix (IAF) in response to the aircraft module.

2. The method as recited in claim 1, further comprising:
    decreasing the altitude of the aircraft from a first altitude at the Final Approach Fix (FAF) to the Minimum Descent Height (MDH) prior to a Missed Approach Point (MAP).

3. The method as recited in claim 2, further comprising:
    locating the Missed Approach Point (MAP) at the offset distance along the final approach inbound course.

4. The method as recited in claim 3, further comprising:
    determining a distance between the Initial Approach Fix (IAF) and a point perpendicular to the landing platform in response to the Minimum Descent Height (MDH) and the offset distance, the point perpendicular to the landing platform beyond the Missed Approach Point (MAP).

5. The method as recited in claim 1, further comprising:
    determining a turn point (TP) in response to the waypoint, the offset distance, the final approach inbound course and the Minimum Descent Height (MDH).

6. The method as recited in claim 5, further comprising:
    determining an arc which intercepts the Initial Approach Fix (IAF) for alignment of the aircraft toward the Final Approach Fix (FAF);
    locating a Turn Point (TP) on the arc to tangentially intercept the arc; and
    directing the aircraft along the arc from the Turn Point (TP) to the Initial Approach Fix (IAF).

7. The method as recited in claim 6, further comprising:
    determining the arc in response to a standard rate turn for the aircraft.

8. The method as recited in claim 7, further comprising:
    determining the arc as the standard rate turn for the aircraft.

9. The method as recited in claim 5, further comprising:
    displaying a first stick map from a current aircraft location to the Turn Point (TP) and from the Turn Point (TP) to the waypoint for the landing platform while the aircraft is greater than a first distance from the Turn Point (TP);

displaying a second stick map from the current aircraft location to the Turn Point (TP), from the Turn Point (TP) to the Initial Approach Fix (IAF), and from the Initial Approach Fix (IAF) to the Final Approach Fix (FAF) while the aircraft is less than the first distance from the Turn Point (TP); and displaying a third stick map from the current aircraft location to the Final Approach Fix (FAF) while the aircraft is inbound of the Initial Approach Fix (IAF), the third stick map having a radar safe area located along the stick map.

10. The method as recited in claim 9, further comprising:
auto range changing from the first, to the second, and to the third stick map.

11. The method as recited in claim 10, further comprising:
auto range changing the third stick map to maintain an end of the radar safe area to maximize the radar view of the approach area.

12. The method as recited in claim 5, further comprising:
displaying a first stick map from a current aircraft location to the Turn Point (TP) and from the Turn Point (TP) to the waypoint for the landing platform while the aircraft is greater than a first distance from the Turn Point (TP);

displaying a second stick map from the current aircraft location to the Turn Point (TP), from the Turn Point (TP) to the Initial Approach Fix (IAF), from the Initial Approach Fix (IAF) to the Final Approach Fix (FAF), from the Final Approach Fix (FAF) to a Missed Approach Point (MAP), from the Missed Approach Point (MAP) to a HOLD pattern while the aircraft is less than the first distance from the Turn Point (TP); and displaying a third stick map from the current aircraft location to the Final Approach Fix (FAF), from the Final Approach Fix (FAF) to a Missed Approach Point (MAP), from the Missed Approach Point (MAP) to a HOLD pattern while the aircraft is inbound of the Initial Approach Fix (IAF), the third stick map having a radar safe area located along the stick map.

13. The method as recited in claim 9, further comprising:
displaying the Turn Point (TP), the Initial Approach Fix (IAF), the Final Approach Fix (FAF), and the Missed Approach Point (MAP) as a box symbol; and displaying the offshore facility as a star symbol.

14. The method as recited in claim 12, further comprising:
displaying the radar safe area as a dotted area which extends from the Final Approach Fix (FAF) symbol to a point past the Missed Approach Point (MAP) symbol.

15. The method as recited in claim 14, further comprising:
displaying the radar safe area with a dotted line symbol at a predetermined width on either side of a localizer line symbol from the Final Approach Fix (FAF) symbol to the Missed Approach Point (MAP) symbol.

16. An aircraft system, comprising:
a module which directs an aircraft to an Initial Approach Fix (IAF) downwind of a Final Approach Fix (FAF), the Initial Approach Fix (IAF) and the Final Approach Fix (FAF) determined in response to a waypoint for a landing platform of an offshore facility, an offset distance from the landing platform input, a final approach inbound course toward the landing platform input and Minimum Descent Height (MDH) input.

17. The system as recited in claim 16, wherein said module is in communication with a flight control computer.

18. The system as recited in claim 16, wherein said module is a portion of a flight control computer.

19. The system as recited in claim 16, wherein said module is in communication with a cockpit interface system operable to receive inputs for communication to the module.

20. The system as recited in claim 16, wherein said module is in communication with a flight control trim actuator system to direct the aircraft.

21. The method as recited in claim 1, further comprising:
decreasing the altitude of the aircraft from a first altitude at the Final Approach Fix (FAF) to the Minimum Descent Height (MDH); and simultaneously decelerating the aircraft while decreasing the altitude to the Minimum Descent Height (MDH).

22. The method as recited in claim 21, further comprising:
decreasing the altitude at an approximate 4 degree glide slope.

23. The method as recited in claim 21, further comprising:
decelerating the aircraft to be approximately 30 kts ground speed at the Minimum Descent Height (MDH).

24. The method as recited in claim 21, further comprising:
decreasing the altitude at an approximate 4 degree glide slope; and decelerating the aircraft to be approximately 30 kts ground speed at the Minimum Descent Height (MDH).

25. A method to facilitate approach of a VTOL aircraft to an offshore facility comprising:
inputting a waypoint for a landing platform of an offshore facility into an aircraft module;

inputting an offset distance from the landing platform into the aircraft module;

inputting a final approach inbound course toward the landing platform into the aircraft module;

inputting a Minimum Descent Height (MDH) for a final descent toward the landing platform into the aircraft module;

determining an Initial Approach Fix (IAF) and a Final Approach Fix (FAF) in response to the waypoint, the offset distance, the final approach inbound course, and the Minimum Descent Height (MDH) with the aircraft module; and determining an arc which intercepts the Initial Approach Fix (IAF) for alignment of the aircraft toward the Final Approach Fix (FAF); and locating a Turn Point (TP) on the arc.

26. The method as recited in claim 25, further comprising:
determining the arc in response to a standard rate turn for the aircraft.

27. The method as recited in claim 25, further comprising:
directing the aircraft to tangentially intercept the arc at the Turn Point (TP).

28. The method as recited in claim 27, further comprising:
directing the aircraft along the arc from the Turn Point (TP) to the Initial Approach Fix (IAF), adjusting aircraft bank angle to maintain position on the arc up to a maximum bank angle of 25°.

29. The method as recited in claim 25, further comprising:
locating the Turn Point (TP) at 1500 feet AGL.

30. The method as recited in claim 25, further comprising:
adjusting the aircraft airspeed to be approximately 80 kts groundspeed at the Turn Point (TP).

31. The method as recited in claim 25, further comprising:
decreasing the altitude at no more than 750 feet per minute; and directing the aircraft to tangentially intercept the arc at the Turn Point (TP) at approximately 80 kts groundspeed.

32. The method as recited in claim 31, further comprising:
locating the Turn Point (TP) at 1500 feet AGL.

33. The method as recited in claim 31, further comprising:
displaying a first stick map from a current aircraft location to the Turn Point (TP) and from the Turn Point (TP) to the waypoint for the landing platform while the aircraft is greater than a first distance from the Turn Point (TP).

34. The method as recited in claim 31, further comprising: decreasing the altitude of the aircraft from a first altitude at the Final Approach Fix (FAF) to the Minimum Descent Height (MDH) prior to a Missed Approach Point (MAP); and simultaneously decelerating the aircraft while decreasing the altitude to the Minimum Descent Height (MDH).

35. The method as recited in claim 34, further comprising: displaying a second stick map from the current aircraft location to the Turn Point (TP), from the Turn Point (TP) to the Initial Approach Fix (IAF), from the Initial Approach Fix (IAF) to the Final Approach Fix (FAF), from the Final Approach Fix (FAF) to a Missed Approach Point (MAP) while the aircraft is less than a first distance from the Turn Point (TP); and directing the aircraft to tangentially intercept the arc at the Turn Point (TP) at approximately 80 kts groundspeed.

36. The system as recited in claim 16, wherein said module is in communication with a flight control computer to simultaneously decelerate and decrease the altitude of the aircraft to a Minimum Descent Height (MDH).

37. The system as recited in claim 16, wherein said module is operable to determine a tangential intercept to a Turn Point (TP) on an arc which intercepts the Initial Approach Fix (IAF).

38. The system as recited in claim 37, wherein said module is operable to determine the arc in response to a standard rate turn of the aircraft.

39. The system as recited in claim 19, wherein said module is operable to display a current function of each coupled axis on the cockpit interface system as a PFD banner.

40. The system as recited in claim 19, wherein said PFD banner includes Pitch, Roll, Collective, and Rig.

41. The system as recited in claim 40, wherein Pitch and roll are coupled to an approach mode.

42. The system as recited in claim 40, wherein Collective is coupled to a radar altitude.

43. The method as recited in claim 1, wherein the aircraft module automatically performs the determining and the directing.

44. The method as recited in claim 1, wherein the VTOL aircraft comprises the aircraft module.

* * * * *